(12) United States Patent
Parvin et al.

(10) Patent No.: US 10,776,606 B2
(45) Date of Patent: Sep. 15, 2020

(54) METHODS FOR DELINEATING CELLULAR REGIONS AND CLASSIFYING REGIONS OF HISTOPATHOLOGY AND MICROANATOMY

(71) Applicant: The Regents of the University of California, Oakland, CA (US)

(72) Inventors: Bahram Parvin, Mill Valley, CA (US); Hang Chang, Moraga, CA (US); Yin Zhou, Newark, DE (US)

(73) Assignee: The Regents of the University of California, Oakland, CA (US)

( * ) Notice: Subject to any disclaimer, the term of this patent is extended or adjusted under 35 U.S.C. 154(b) by 134 days.

(21) Appl. No.: 14/493,208

(22) Filed: Sep. 22, 2014

(65) Prior Publication Data
US 2015/0110381 A1 Apr. 23, 2015

Related U.S. Application Data

(60) Provisional application No. 62/017,770, filed on Jun. 26, 2014, provisional application No. 61/880,965, filed on Sep. 22, 2013.

(51) Int. Cl.
G06K 9/00 (2006.01)
G06K 9/62 (2006.01)

(52) U.S. Cl.
CPC ....... G06K 9/00147 (2013.01); G06K 9/6249 (2013.01); G06K 9/6255 (2013.01)

(58) Field of Classification Search
None
See application file for complete search history.

(56) References Cited

U.S. PATENT DOCUMENTS

| | | | | |
|---|---|---|---|---|
| 2002/0186874 A1* | 12/2002 | Price | ............... | G01N 15/147 |
| | | | | 382/133 |
| 2004/0139103 A1* | 7/2004 | Boyce | ............... | G06K 9/00127 |
| 2009/0116737 A1* | 5/2009 | Kiraly | ............... | G06K 9/6269 |
| | | | | 382/160 |
| 2015/0262384 A1* | 9/2015 | Motomura | ............ | G06T 7/0012 |
| | | | | 348/79 |

OTHER PUBLICATIONS

LeCun, Yann, Koray Kavukcuoglu, and Clement Farabet. "Convolutional networks and applications in vision." ISCAS. 2010.*

(Continued)

*Primary Examiner* — Sean M Conner
(74) *Attorney, Agent, or Firm* — Sheppard, Mullin, Richter & Hampton LLP

(57) ABSTRACT

Embodiments disclosed herein provide methods and systems for delineating cell nuclei and classifying regions of histopathology or microanatomy while remaining invariant to batch effects. These systems and methods can include providing a plurality of reference images of histology sections. A first set of basis functions can then be determined from the reference images. Then, the histopathology or microanatomy of the histology sections can be classified by reference to the first set of basis functions, or reference to human engineered features. A second set of basis functions can then be calculated for delineating cell nuclei from the reference images and delineating the nuclear regions of the histology sections based on the second set of basis functions.

26 Claims, 13 Drawing Sheets

(56) References Cited

OTHER PUBLICATIONS

McGrath, Kathleen E., Timothy P. Bushnell, and James Palis. "Multispectral imaging of hematopoietic cells: where flow meets morphology." Journal of immunological methods 336.2 (2008): 91-97.*
Pang, Baochuan, et al. "Cell nucleus segmentation in color histopathological imagery using convolutional networks." 2010 Chinese Conference on Pattern Recognition (CCPR). IEEE, 2010. (Year: 2010).*
Kavukcuoglu, Koray, et al. "Learning convolutional feature hierarchies for visual recognition." Advances in neural information processing systems. 2010. (Year: 2010).*
Ali, S., Madabhushi, A: An integrated region-, boundry-, and shape-based active contour for multiple object overlap resolution in histological imagery. IEEE Transactions on Medical Imaging 31(7) (2012) 1448-1460.
D. Axelrod, N. Miller, H. Lickley, J. Qian, W. Christens-Barry, Y. Yuan, Y. Fu, and J. Chapman. Effect of quantitative nuclear features on recurrence of ductal carcinoma in situ (dcis) of breast. In Cancer Informatics, 4:99-109, 2008.
A Basavanhally, J. Xu, A Madabhushu, and S. Ganesan. Computer-aided prognosis ofER+ breast cancer histopathology and correlating survival outcome with oncotype DX assay. In ISBI, pp. 851-854, 2009.
R. Bhagavatula, M. Fickus, W. Kelly, C. Guo, J. Ozolek, C. Castro, and J. Kovacevic. Automatic identification and delineation of germ layer components in h&e stained images of teratomas derived from human and nonhuman primate embryonic stem cells. In ISBI, pp. 1041-1044,2010.
O. Boiman, E. Shechtman, and M. Irani. In defense of nearest-neighbor based image classification. In Proceedings of the Conference on Computer Vision and Pattern Recognition, pp. 1-8, 2008.
A Bosch, A Zisserman, and X. Mu-Noz. Scene classification using a hybrid generative/discriminative approach. IEEE Transactions on Pattern Analysis and Machine Intelligence, 30(4):712-727, Apr. 2008.
H. Bristow, A Eriksson, and S. Lucey. Fast convolutional sparse coding. In Computer Vision and Pattern Recognition (CVPR), 2013 IEEE Conference on, pp. 391-398,2013.
H. Chang, M. Auer, and B. Parvin, Structural annotation of EM images by graph cut, In IEEE ISBI, pp. 1103-1106,2009.
H. Chang, G. Fontenay, J. Han, G. Cong, F. Baehner, J. Gray, P. Spellman, and B. Parvin. Morphometric analysis of TCGA Gliobastoma Multiforme. BMC Bioinformatics, 12(1),2011.
H. Chang, L. Loss, P. Spellman, A Borowsky, and B. Parvin. Batch-invariant nuclear segmentation in whole mount histology sections. In ISBI, pp. 856-859, 2012.
Chang, H., Han, J., Borowsky, A, Loss, L., Gray, J.W., Spellman, P.T., Parvin, B.: Invariant delineation of nuclear architecture in glioblastoma multiforme for clinical and molecular association. IEEE Transactions on Medical Imaging 32(4) (2013a) 670-682.
H. Chang, A Borowsky, P. Spellman, and B. Parvin. Classification of tumor histology via morphometric context. In Proceedings of the Conference on Computer Vision and Pattern Recognition,2013b.
H. Chang, N. Nayak, P. Spellman, and B. Parvin. Characterization of tissue histopathology via predictive sparse decomposition and spatial pyramid matching. Medical image computing and computed-assisted intervention—MICCAI, 2013c.
L. Dalton, S. Pinder, C. Elston, I. Ellis, D. Page, W. Dupont, and R Blarney. Histolgical gradings of breast cancer: linkage of patient outcome with level of pathologist agreements. Modern Pathology, 13(7):730-735,2000.
M. Datar, D. Padfield, and H. Cline. Color and texture based segmentation of molecular pathology images using HSOMs. In ISBI, pp. 292-295, 2008.
C. Demir and B. Yener. Automated cancer diagnosis based on histopathological images: A systematic survey. Technical Report, Rensselaer Polytechnic Institute, Department of Computer Science, 2009.
M. Elad and M. Aharon. Image denoising via sparse and redundant representations over learned dictionaries. IEEE Transactions on Image Processing, 15(12):3736-3745, Dec. 2006.
S. Doyle, M. Feldman, J. Tomaszewski, N. Shih, and A Madabhushu. Cascaded multi-class pairwise classifier (CAS CAMP A) for normal, cancerous, and cancer confounder classes in prostate histology. In ISBI, pp. 715-718, 2011.
M. Everingham, L. Van Gool, C. K I. Williams, J. Winn, and A Zisserman. The PASCAL Visual Object Classes Challenge 2012 (VOC2012) Results. http://www .pascalnetwork. org/ challenges/ VOC/voc20 12/workshop/index. html.
R-E. Fan, K-W. Chang, C.-J. Hsieh, X.-R Wang, and C.-J. Lin. Liblinear: A library for large linear classification. Journal of Machine Learning Research, 9:1871-1874, 2008.
H. Fatakdawala, J. Xu, A Basavanhally, G. Bhanot, S. Ganesan, F. Feldman, J. Tomaszewski, and A Madabhushi. Expectation-maximization-driven geodesic active contours with overlap resolution (EMaGACOR): Application to lymphocyte segmentation on breast cancer histopathology. IEEE Transactions on Biomedical Engineering, 57(7): 1676-1690, 2010.
Ghaznavi, F., Evans, A, Madabhushi, A, Feldman, M.: Digital imaging in pathology: wholeslide imaging and beyond. Annu Rev Pathology 8 (2012) 331-359.
K Grauman and T. Darrell. The pyramid match kernel: discriminative classification with sets of image features. In Proceedings of the IEEE International Conference on Computer Vision, vol. 2, pp. 1458-1465, 2005.
M. Gurcan, L. Boucheron, A Can, A Madabhushi, N. Rajpoot, and Y. Bulent. Histopathological image analysis: a review. IEEE Transactions on Biomedical Engineering, 2:147-171,2009.
J. Han, H. Chang, L. Loss, K. Zhang, F. Baehner, J. Gray, P. Spellman, and B. Parvin. Comparison of sparse coding and kernel methods for histopathological classification of glioblastoma multiforme. In ISBI, pp. 711-714, 2011.
C. Huang, A Veillard, N. Lomeine, D. Racoceanu, and L. Roux. Time efficient sparse analysis of histopathological whole slide images. Computerized medical imaging and graphics, 35(7-8):579-591, 2011.
K. Jarrett, K. Kavukcuoglu, M. Ranzato, and Y. Lecun. What is the best multi-stage architecture for object recognition? In Computer Vision, 2009 IEEE 12th International Conference on, pp. 2146-2153, 2009.
K. Kavukcuoglu, M. Ranzato, and Y. Lecun. Fast inference in sparse coding algorithms with applications to object recognition. Technical Report CBLL-TR-2008-12-01, Computational and Biological Learning Lab, Courant Institute, NYU, 2008.
J. Kong, L. Cooper, A Sharma, T. Kurk, D. Brat, and J. Saltz. Texture based image recognition in microscopy images of diffuse gliomas with multi-class gentle boosting mechanism. In ICASSAP, pp. 457-460,2010.
S. Kothari, J. Phan, A Osunkoya, and M. Wang. Biological interpretation of morphological patterns in histopathological whole slide images. In ACM Conference on Bioinformatics, Computational Biology and Biomedicine, 2012.
Kothari, S., Phan, J., Young, A, Wang, M.: Histological image classification usmg biologically interpretable shape-based features. BMC Medical Imaging 13(9) , 2013.
S. Lazebnik, C. Schmid, and J. Ponce. Beyond bags of features: Spatial pyramid matching for recognizing natural scene categories. In Proceedings of the Conference on Computer Vision and Pattern Recognition, pp. 2169-2178,2006.
Q. Le, J. Han, J. Gray, P. Spellman, A Borowsky, and B. Parvin. Learning invariant features from tumor signature. In ISBI, pp. 302-305,2012.
F.-F. Li and P. Perona. A bayesian hierarchical model for learning natural scene categories. In Proceedings of the Conference on Computer Vision and Pattern Recognition, pp. 524-531, Washington, DC, USA, 2005. IEEE Computer Society.
J. Mairal, F. Bach, J. Ponce, G. Sapiro, and A Zisserman. Supervised dictionary learning. In NIPS, 2008.
J. Mairal, F. Bach, J. Ponce, and G. Sapiro. Online dictionary learning for sparse coding. In Proceedings of the 26th Annual

(56) References Cited

OTHER PUBLICATIONS

International Conference on Machine Learning, ICML '09, pp. 689-696, New York, NY, USA, 2009. ACM.
F. Moosmann, B. Triggs, and F. Jurie. Randomized clustering forests for building fast and discriminative visual vocabularies. In NIPS, 2006.
Nayak, N., Chang, H., Borowsky, A, Spellman, P.T., Parvin, B.: Classification of tumor histopathology via sparse feature learning. In: International Symposium on Biomedical Imaging. (2013).
N. Otsu. A threshold selection method from gray-level histograms. IEEE Transactions on Systems, Man and Cybernetics, 9(1):62-66, 1979.
P. Quelhas, F. Monay, J.-M. Odobez, D. Gatica-Perez, T. Tuytelaars, and L. Van Gool. Modeling scenes with local descriptors and latent aspects. In Proceedings of the IEEE International Conference on Computer Vision, ICCV '0S, pp. 883-890, Washington, DC, USA, 2005. IEEE Computer Society.
R. Rigamonti and V. Lepetit. Accurate and efficient linear structure segmentation by leveraging ad hoc features with learned filters. In N. Ayache, H. Delingette, P. Golland, and K. Mori, editors, Medical Image Computing and Computer-Assisted Intervention MICCAI 2012, vol. 7510 of Lecture Notes in Computer Science, pp. 189-197. Springer Berlin Heidelberg, 2012.
A Ruifork and D. Johnston. Quantification of histochemical staining by color decomposition. Anal Quant Cytol Histology, 23(4):291-299, 2001.
P. Sermanet, K. Kavukcuoglu, S. Chintala, and Y. Lecun. Pedestrian detection with unsupervised multi-stage feature learning. In Computer Vision and Pattern Recognition (CVPR), 2013 IEEE Conference on, pp. 3626-3633,2013.
T. Serre, L.Wolf, and T. Poggio. Object recognition with features inspired by visual cortex. In Proceedings of the Conference on Computer Vision and Pattern Recognition, vol. 2, pp. 994-1000,2005.
A Vedaldi and A Zisserman. Efficient additive kernels via explicit feature maps. IEEE Transactions on Pattern Analysis and Machine Intelligence, 34(3):480-492, 2012.
Q. Wen, H. Chang, and B. Parvin. A Delaunay triangulation approach for segmenting clumps of nuclei. In ISBI, pp. 9-12, 2009.
J. Yang, K. Yu, Y. Gong, and T. Huang. Linear spatial pyramid matching using sparse coding for image classification. In Proceedings of the Conference on Computer Vision and Pattern Recognition, pp. 1794-1801, 2009.
R. A. Young and R. M. Lesperance. The gaussian derivative model for spatial-temporal vision. 1. Cortical Model. Spatial Vision, 2001:3-4, 2001.
M. Zeiler, D. Krishnan, G. Taylor, and R. Fergus. Deconvolutional networks. In Computer Vision and Pattern Recognition (CVPR), 2010 IEEE Conference on, pp. 2528-2535,2010. 2, 3.
M. Zeiler, G. Taylor, and R. Fergus. Adaptive deconvolutional networks for mid and high level feature learning. In Computer Vision (ICC V), 2011 IEEE International Conference on, pp. 2018-2025,2011.
Y. Zhou, H. Chang, K. Barner, P. Spellman, and B. Parvin. Classification of Histology Sections via Multispectral Convolutional Sparse Coding. In Computer Vision and Pattern Recognition (CVPR), IEEE Conference on, pp. 3081-3088,2014.
H Chang, Y Zhou, P Spellman, and B Parvin, "Stacked Predictive Sparse Coding for Classification of Distinct Regions of Histopathology," International Conference on Computer Vision (ICCV), 2013.
Wikipedia, Radial basis function, https://en.wikipedia.org/wiki/Radial_basis_function, Dec. 29, 2018, 4 pages.
Wikipedia, Support-vector machine, https://en.wikipedia.org/wiki/Support-vector_machine, Feb. 11, 2019, 17 pages.
Wikipedia, Radial basis function kernel, https://en.wikipedia.org/wiki/Radial_basis_function_kernel, Jan. 15, 2019, 2 pages.

* cited by examiner 100 atoms of D and B, size 21-by-21

METHODS FOR DELINEATING CELLULAR REGIONS AND CLASSIFYING REGIONS OF HISTOPATHOLOGY AND MICROANATOMY

INCORPORATION BY REFERENCE TO ANY PRIORITY APPLICATIONS

This application claims priority to U.S. Provisional Patent Application No. 61/880,965 filed on Sep. 22, 2013, and U.S. Provisional Patent Application No. 62/017,770 filed on Jun. 26, 2014, both of which are hereby incorporated by reference in their entireties.

STATEMENT REGARDING FEDERALLY SPONSORED R&D

This invention was made with government support under Contract No. DE-AC02-05CH11231 awarded by the U.S. Department of Energy and under Grant Nos. CA1437991 and CA140663 awarded by the National Institutes of Health. The government has certain rights in the invention.

BACKGROUND

Field of the Invention

The present invention relates to systems and methods for classification of histology composition and delineation of cellular regions while remaining invariant to the batch effects via deep learning and sparse coding.

Description of the Related Art

Tissue sections are often stained with hematoxylin and eosin (H&E), which label DNA (e.g., nuclei) and protein contents, respectively, in various shades of color. They can provide a wealth of information about the tissue architecture (e.g., tumor). Even though there are inter- and intra-observer variations (Dalton et al, 2000), a trained pathologist always uses rich content (e.g., various cell types, cellular organization, cell state and health), in context, to characterize tumor architecture. At macro level, tissue composition (e.g., stroma versus tumor) can be quantified. At micro level, cellular features such as cell types, cell state, and cellular organization can be queried. Aberrations in the tissue architecture often reflect disease progression. However, outcome-based analysis requires a large cohort, and the performance of the existing techniques is hindered as a result of large technical and biological variations that are always present in such a cohort.

The current state of art relies on ad hoc models to (i) segment nuclear regions and (ii) classify distinct regions of histopathology. For example, intensity features may be used to identify cells or may use some sort of feature extraction from underlying local patches to classify distinct regions of histopathology. These techniques suffer from robustness as a result of the batch effect (e.g., technical variations in sample preparation) and biological heterogeneity. As a result, present techniques are not applicable to a large cohort of histology sections that are collected from different laboratories that do not adhere to an identical protocol. The significant of processing a large cohort of histology sections is that it will pave the way to develop new taxonomies for patient population and their response to therapies. The net effect is realization of personalized medicine from a simple histology sections.

Analysis of tumor histopathology is generally characterized into three categories of research (Gurcan et al, 2009); nuclear segmentation and multidimensional representation of tumor cells as an imaging biomarker; patch-based analysis and recruitment of lymphocytes. Currently, research is being conducted on analysis of whole slide imaging, tumor heterogeneity and composition, and integration with molecular data. Main strategies include fine tuning human engineered features and unsupervised feature learning. Fine tuning engineered features (FIG. 1) has been described by Chang et al, 2009, Han et al, 2011; Kong et al, 2010 and Kothari et al, 2012. Integration with molecular data has been described by Huang et al, 2011; Le et al, 2012; Nayak et al, 2013. Examples of unsupervised feature learning include Auto Encoder, which utilizes backpropagation to learn from unlabeled data (Mussa et al, 2005, Nelwamondo et al, 2007), Restricted Boltzman Machine (Hinton, 2006), Independent Space Analysis (Hyvärinen et al, 2009), and reconstruction independent subspace analysis (RISA) (V. Quoc, J. Han, J. Gray, P T Spellman, and B. Pavrin, IEEE ISBI 2012, 302-305). In addition, U.S. patent application Ser. No. 13/886,213, filed on May 2, 2013 relates to determining a prognosis or therapy for a patient by analyzing stained tissue samples.

SUMMARY

In one aspect, embodiments disclosed herein provide methods for delineating cell nuclei and classifying regions of histopathology or microanatomy while remaining invariant to batch effects, comprising: providing a plurality of reference images of histology sections; determining a first set of basis functions from the reference images; classifying histopathology or microanatomy of the histology sections by reference to the first set of basis functions or reference to human engineered features; determining a second set of basis functions for delineating cell nuclei from the reference images; and delineating the nuclear regions of the histology sections based on second set of basis functions.

In some embodiments, determining the first or second set of basis functions comprises using unsupervised feature learning techniques. In some embodiments, the unsupervised feature learning techniques comprise building spatial histograms by spatial pooling of the features learned from the reference images. In some embodiments, the unsupervised feature learning for nuclear delineation (segmentation) comprises:

$$L = \min_{D,w} \left\| Y - \sum_{i=1}^{k} w_i \sigma(D_i * X) \right\|_F^2$$

wherein X is the image, Y is the annotation mask (binary), $D_i$ is the i-th convolutional kernel, and $w_i$ is the i-th weight, which is scaler. In some embodiments, the unsupervised feature learning for nuclear delineation (segmentation) comprises:

$$L = \min_{D,w,Z} \left\| X - \sum_{i=1}^{k} D_i * Z_i \right\|_F^2 + \left\| Y - \sum_{i=1}^{k} w_i \sigma(D_i * X) \right\|_F^2 + \|Z\|_1$$

wherein X is the image, Y is the annotation mask (binary), $Z_i$ is the i-th sparse feature map associated with the i-th convolutional kernel $D_i$, and $w_i$ is the i-th weight, which is scaler. In some embodiments, the unsupervised feature learning is by predictive sparse decompositions (PSDs) from random sampling of small patches of images. In some embodiments, the PSDs are stacked to improve classification of histopathology or microanatomy. In some embodiments, the unsupervised feature learning is by convolutional sparse coding (CSC) and spatial pyramid matching (SPM).

In some embodiments, the reference images are labeled or annotated. In some embodiments, the reference images are whole slide images of histology sections. In some embodiments, analyzing the plurality of reference images comprises analyzing a plurality of multispectral reference images. In some embodiments, the reference images were captured through bright field imaging, multiplexed imaging via labeled antibodies, infrared spectroscopy, or Raman microscopy. In some embodiments, the histopathology is based on cell-based or tissue based features.

In some embodiments, the cell-based features are cell-type, cell state, cellular organization or cell-to-cell boundary features. In some embodiments, delineating the nuclear regions in the reference images comprises delineating cell nuclei based on human engineered features. In some embodiments, delineating the cell nuclei is based on delineating nuclear morphometric features. In some embodiments, the morphometric features are selected from the group consisting of, for example: nuclear size, nuclear voronoi size, aspect ratio of the segmented nucleus, major axis, minor axis, rotation, bending energy, STD curvature, abs max curvature, mean nuclear intensity, STD nuclear intensity, mean background intensity, STD background intensity, mean nuclear gradient, and STD nuclear gradient.

In some embodiments, the methods disclosed herein comprise building dictionaries from the nuclear morphometric features via vector quantization or sparse coding followed by spatial pyramid matching. In some embodiments, the methods disclosed herein comprise computing a histology signature to classify tumor grades of tissues in the sample tissue images. In some embodiments, the histology signature relates to low grade glioma (LGG) or glioblastoma multiforme (GBM). In some embodiments, the methods disclosed herein comprise aggregating the classified histology types over a large cohort of samples to construct taxonomies of populations for evaluating therapeutic responses, predicting outcome, and discovery of new biomarkers. In some embodiments, nuclear features within regions of microanatomy or histopathology are aggregated over a cohort for constructing taxonomies of nuclear architecture for evaluating therapeutic responses, predicting outcomes, and discovery of new biomarkers.

In another aspect, embodiments disclosed herein provide systems for delineating cell nuclei and classifying regions of histopathology or microanatomy, comprising: a plurality of reference images of histology sections; and a processor configured to perform a method of: determining a first set of basis functions from the reference images; classifying histopathology or microanatomy of the histology sections by reference to the first set of basis functions or reference to human engineered features; determining a second set of basis functions for delineating cell nuclei from the reference images; and delineating the nuclear regions of the histology sections based on second set of basis functions.

DETAILED DESCRIPTION

Figure 1:
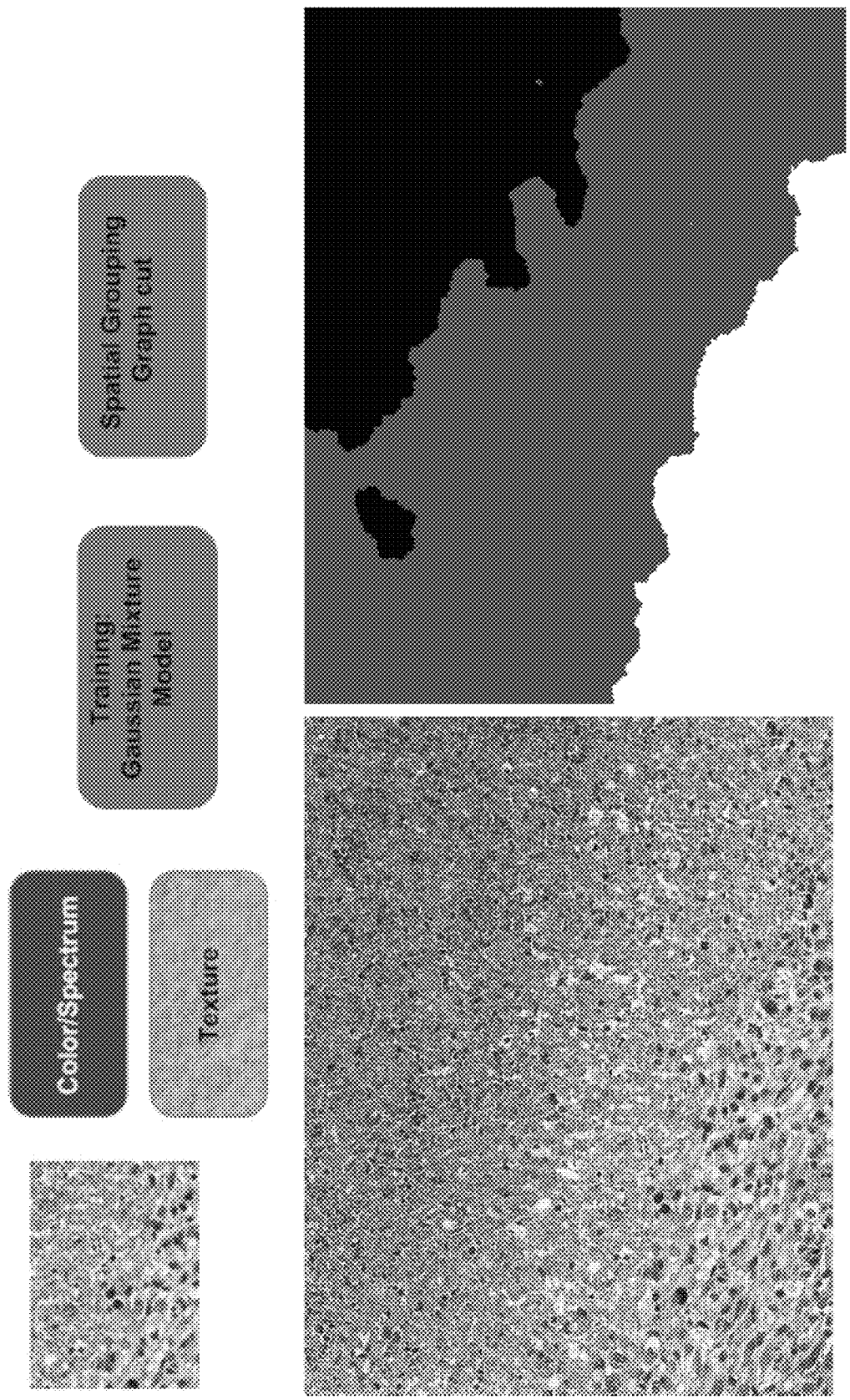
FIG. 1 shows images as an example of classification using human engineered features described in Chang et al, 2010.

All patents, applications, published applications and other publications referred to herein are incorporated by reference to the referenced material and in their entireties. If a term or phrase is used herein in a way that is contrary to or otherwise inconsistent with a definition set forth in the patents, applications, published applications and other publications that are herein incorporated by reference, the use herein prevails over the definition that is incorporated herein by reference.

Other objects, advantages and features of the present invention will become apparent from the following specification taken in conjunction with the accompanying drawings.

Embodiments relate to systems and methods for delineating differences between cells and cell populations. In the present disclosure, many of the past problems (e.g., batch effect) encountered in characterizing cellular compositions using automated histological analysis are overcome by using deep learning techniques to classify histopathology, microanatomy or nuclear features of cells and tissues. As used herein, deep learning techniques include processes and procedures that use model architectures composed of non-linear transformations. One advantage of deep learning systems is that they utilize unsupervised learning problems.

Embodiments disclosed herein provide systems and methods for accurately identifying subtypes of morphometric signatures by unsupervised training of the system followed by predicting the cellular features of a newly presented sample. Thus, subtypes may be predictive of the outcome by analyzing a large cohort of whole slide images (WSIs) through (i) cell-by-cell profiling, and/or (ii) characterizing tumor histopathology using unsupervised feature learning such as predictive sparse decomposition (SPD) and convolutional sparse coding (CSC) in combination with spatial pyramid matching (SPM). The systems and methods disclosed herein may use spatial pyramid matching (SPM) to classify tumor histopathology using engineered or learned features.

In some embodiments, the systems and methods disclosed herein enable (i) classification of distinct microanatomy and/or histopathology, and/or (ii) profiling of individual cells while maintaining a reduced batch effect so that samples prepared by a wide variety of methods can be accurately analyzed. As a result, embodiments of the systems and methods disclosed herein may (a) save time for the pathologists by pre-identifying aberrant regions, (b) assess frequency and organization of cellular processes such as mitosis, (c) enable precision medicine by sifting through vast amount of data, and (d) quantify tissue composition for assessing tumor-stroma interactions as a function of individual cells in each compartment thus, leading to improved predictive models.

One embodiment is an extensible method for delineating cell nuclei and classifying regions of histopathology or microanatomy from reference images of tissue taken from a patient. The reference images can be from a few images to dozens or thousands of reference images. In addition, the reference images can be relatively small images, such as 1000-by-1000 pixels up to and including whole slide images of approximately 100 thousand by 100 thousand pixels. In addition, embodiments of the process are invariant to batch effects, such that each slide can be prepared in by differing methods while still being able to be properly analyzed and categorized by the system. In prior systems, each batch needed to be prepared similarly in order for the classification system to operate properly. However, embodiments of this invention are invariant to the batch effect such that virtually any typical tissue preparation procedure could be used with differing samples, and the system could still properly determine the histopathology and delineate the cell nuclei of the different samples.

Once the system has provided a plurality of reference images of histology sections from different patients, a first set of basis functions is determined from the reference images, as discussed in more detail below. Those basis functions, or a reference to human engineered features, are then used to classify the histopathology or microanatomy of the histology sections in the reference images. A second set of basis functions is then determined from the reference images in order to delineate cell nuclei from the tissue samples captured in the reference images. From those basis functions, the nuclear regions of the histology sections are then determined.

Accordingly, embodiments of the invention include systems for delineating cell nuclei and classifying regions of histopathology or microanatomy, which include a plurality of reference images of histology sections. The reference images may be stored locally on the same computer that is providing the analysis, or on a different server or system that is removed from the local computer. In addition, the systems may have one or more processors configured to perform classification and delineation processes described in more detail below. For example, the systems may have one or more processors configured to determine a first set of basis functions from the reference images, classify the histopathology or microanatomy of the histology sections by reference to the first set of basis functions or reference to human engineered features, determine a second set of basis functions for delineating cell nuclei from the reference images, and delineate the nuclear regions of the histology sections based on second set of basis functions. The results from this classification and delineation process can be output to a typical computer monitor or display in a graphical or textural format so that the operator can easily determine the results.

EXAMPLES

The following examples are offered to illustrate but not to limit the invention.

In order to facilitate understanding, the specific embodiments are provided to help interpret the technical proposal, that is, these embodiments are only for illustrative purposes, but not in any way to limit the scope of the invention. Unless otherwise specified, embodiments do not indicate the specific conditions, are in accordance with the conventional conditions or the manufacturer's recommended conditions.

Example 1: Characterization of Tissue Histopathology Via Predictive Sparse Decomposition and Spatial Pyramid Matching Disclosed in this example is a tissue classification system and method based on predictive sparse decomposition (PSD) (Kavukcuoglu et al, 2008) and spatial pyramid matching (SPM) (Lazebnik et al, 2006), which utilize sparse tissue morphometric signatures at various locations and scales. Because of the robustness of unsupervised feature learning and the effectiveness of the SPM framework, this method achieved excellent performance even with small number of training samples across independent datasets of tumors. As a result, the composition of tissue histopathology in a whole slide image (WSI) was able to be characterized. In addition, mix grading could also be quantified in terms of tumor composition. Computed compositional indices, from WSI, could then be utilized for outcome based analysis, such as prediction of patient survival statistics or likely responses to therapeutic regimens.

A general approach to the analysis of hematoxylin and eosin (H&E) stained tissue sections can be found in Gurcan et al, 2009 or Ghaznavi et al, 2013. As will be appreciated, the trend has been based either on nuclear segmentation and corresponding morphometric representation (Ali et al, 2012, Chang et al, 2013a), or patch-based representation of the histology sections (Kothari et al, 2012, Kothari et al, 2013, Nayak et al, 2013). The major challenge for tissue classification has been the large amounts of technical and biological variations in the data, which typically results in techniques that are tumor type specific. To overcome this problem, some recent studies have focused on either fine tuning human engineered features (Kothari et al, 2012, Kothari et al, 2013), or applying automatic feature learning (Nayak et al, 2013, Le et al, 2012). In the context of image categorization research, the SPM kernel (Lazebnik et al, 2006) has emerged as one component for these systems (Everingham et al, 2012).

Pathologists often use "context" to assess the disease state. At the same time, SPM partially captures context because of its hierarchical nature. In embodiments of this invention, we encode sparse tissue morphometric signatures, at different locations and scales, within the SPM framework. This results in data that is highly robust and effective across multiple tumor types and with a limited number of training samples.

Approach

Figure 2:
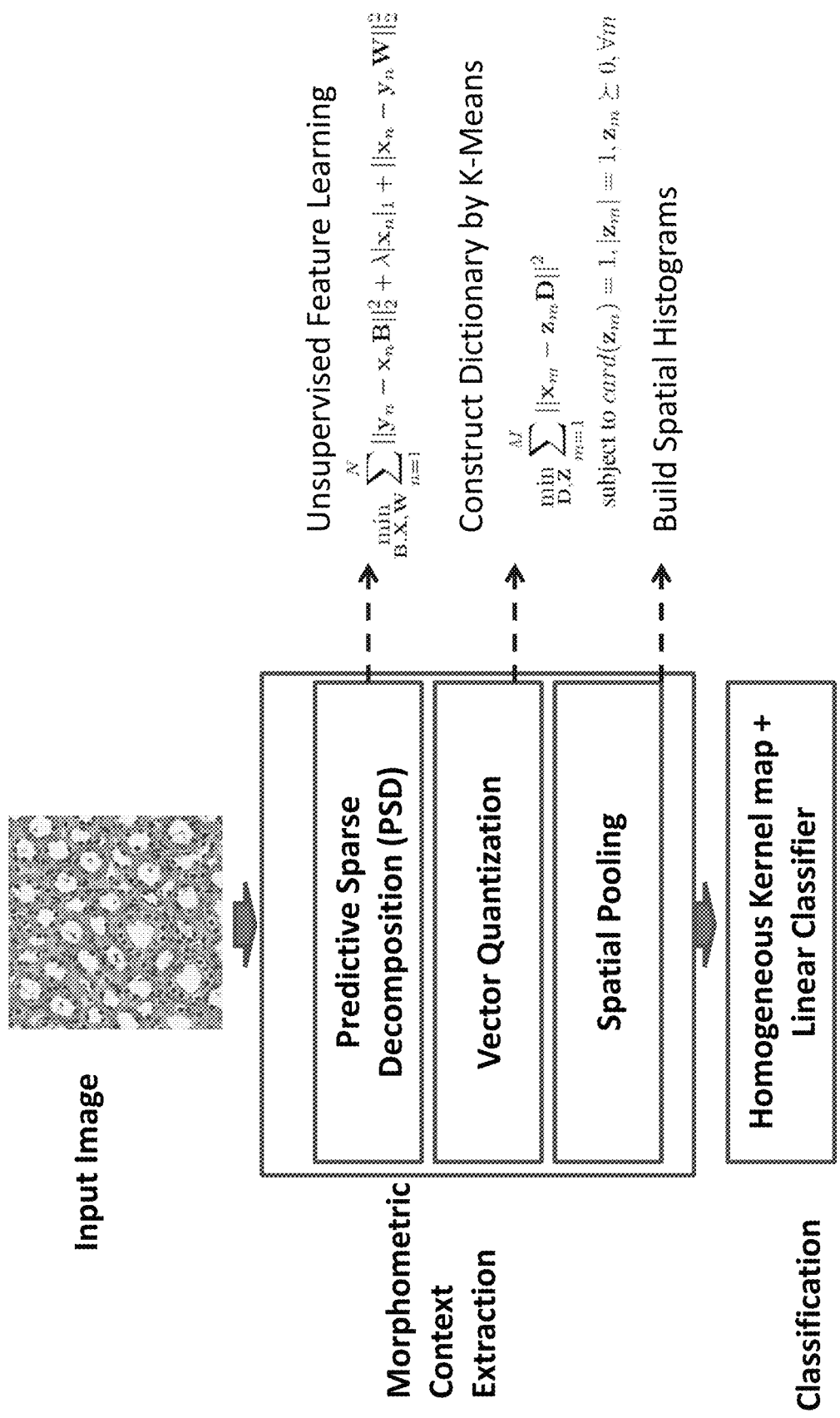
FIG. 2 shows a flow chart illustrating an exemplary embodiment of classification of regions of microanatomy and histopathology using predictive space coding (PSD) and spatial pyramid matching (SPM), referred to as PSDSPM.
Figure 3:
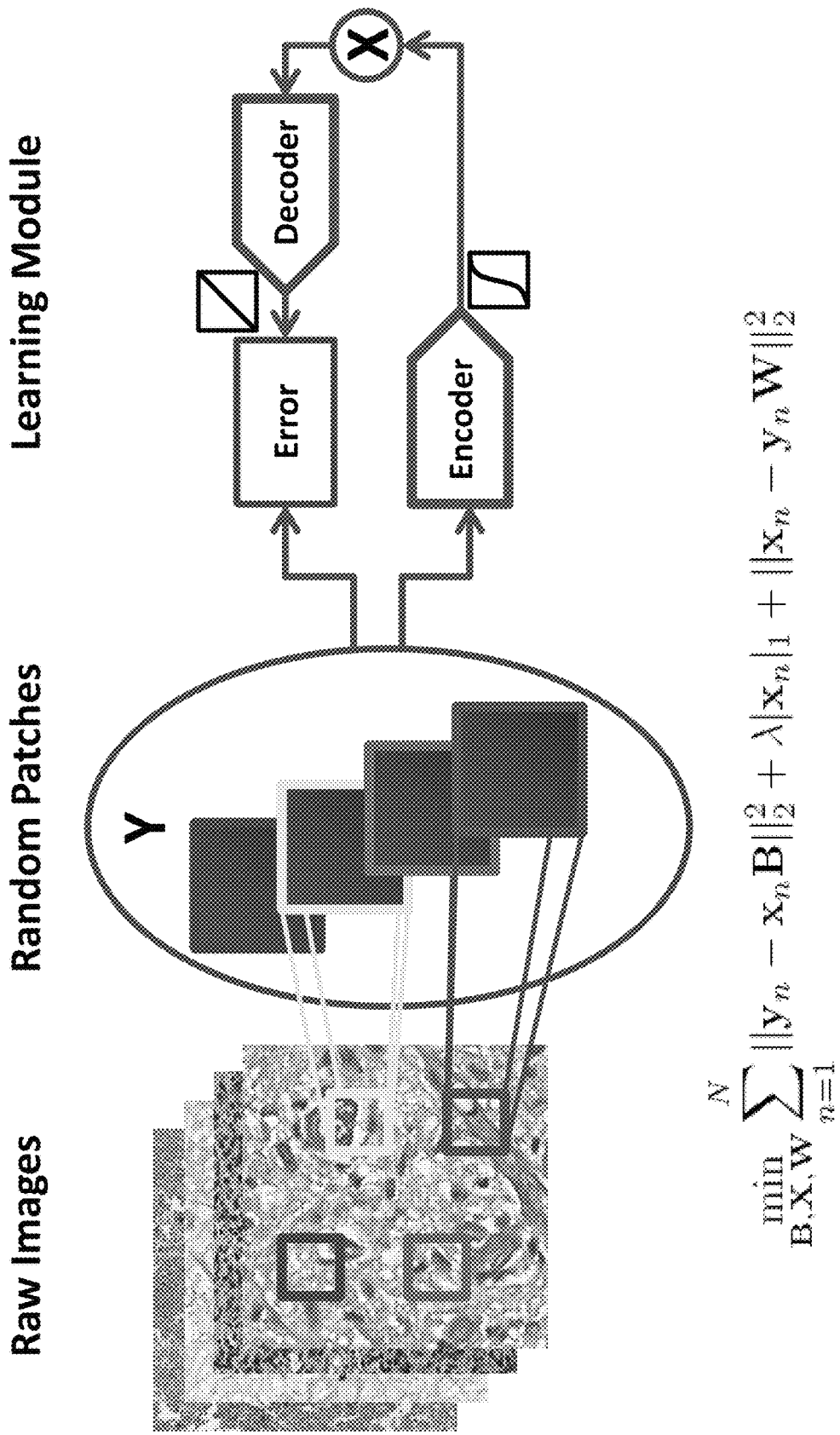
FIG. 3 shows a schematic diagram illustrating an exemplary embodiment of unsupervised feature learning by PSD. This system learns kernels (basis functions) for reconstruction of the original image.

One proposed approach (PSDSPM) is shown in FIG. 2, wherein the traditional human engineered features from a scale-invariant feature transform (SIFT) are replaced with a sparse tissue morphometric feature, generated through unsupervised feature learning, within the SPM framework (Reference: H. Chang, N. Nayak, P T Spellman, and B. Parvin, "Characterization of tissue histopathology via predictive space coding and spatial pyramid matching, MICCAI, 2013). This approach consists of the following steps:

1. Construct sparse auto encoder (W) for the extraction of sparse tissue morphometric feature (FIG. 3) by the following optimization:

$$\min_{B,X,W} \sum_{n=1}^{N} \|y_n - x_n B\|_2^2 + \lambda |x_n|_1 + \|x_n - y_n W\|_2^2 \quad (1)$$

where $Y=[y_1; \ldots; y_N]$ is a set of vectorized image patches; B is a set of basis functions; $X=[x_1; \ldots; x_N]$ is a set of sparse tissue morphometric features; and W is the auto encoder. The training process is as follows:

(a) Randomly initialize B and W.
(b) Fix B and W and minimize Equation 1 with respect to X, where X for each input vector is estimated via the gradient descent method.
(c) Fix X and estimate B and W, where B and W are approximated through stochastic gradient descent algorithm.

Examples of computed basis functions from the GBM and KIRC datasets show that the dictionary captures color and texture information in the data which are difficult to obtain using human engineered features.

2. Construct dictionary (D), where $D=[d_1; \ldots; d_K]^T$ are the K sparse tissue morphometric types to be learned by the following optimization:

$$\min_{D,Z} \sum_{m=1}^{M} \|x_m - z_m D\|^2 \quad (2)$$

subject to card $(z_m) = 1$, $|z_m| = 1$, $z_m \geq 0$, $\forall m$ where $X=[x_1; \ldots; x_M]^T$ is a set of sparse tissue morphometric features generated through the autoencoder (W); $Z=[z_1; \ldots; z_M]^T$ indicates the assignment of the sparse tissue morphometric type, card $(z_m)$ is a cardinality constraint enforcing only one nonzero element of $z_m$, $z_m \geq$ is a non-negative constraint on the elements of $z_m$, and $|z_m|$ is the L1-norm of $z_m$. During training, Equation 2 is optimized with respect to both Z and D; in the coding phase, for a new set of X, the learned D is applied, and Equation 2 is optimized with respect to Z only.

Figure 4:
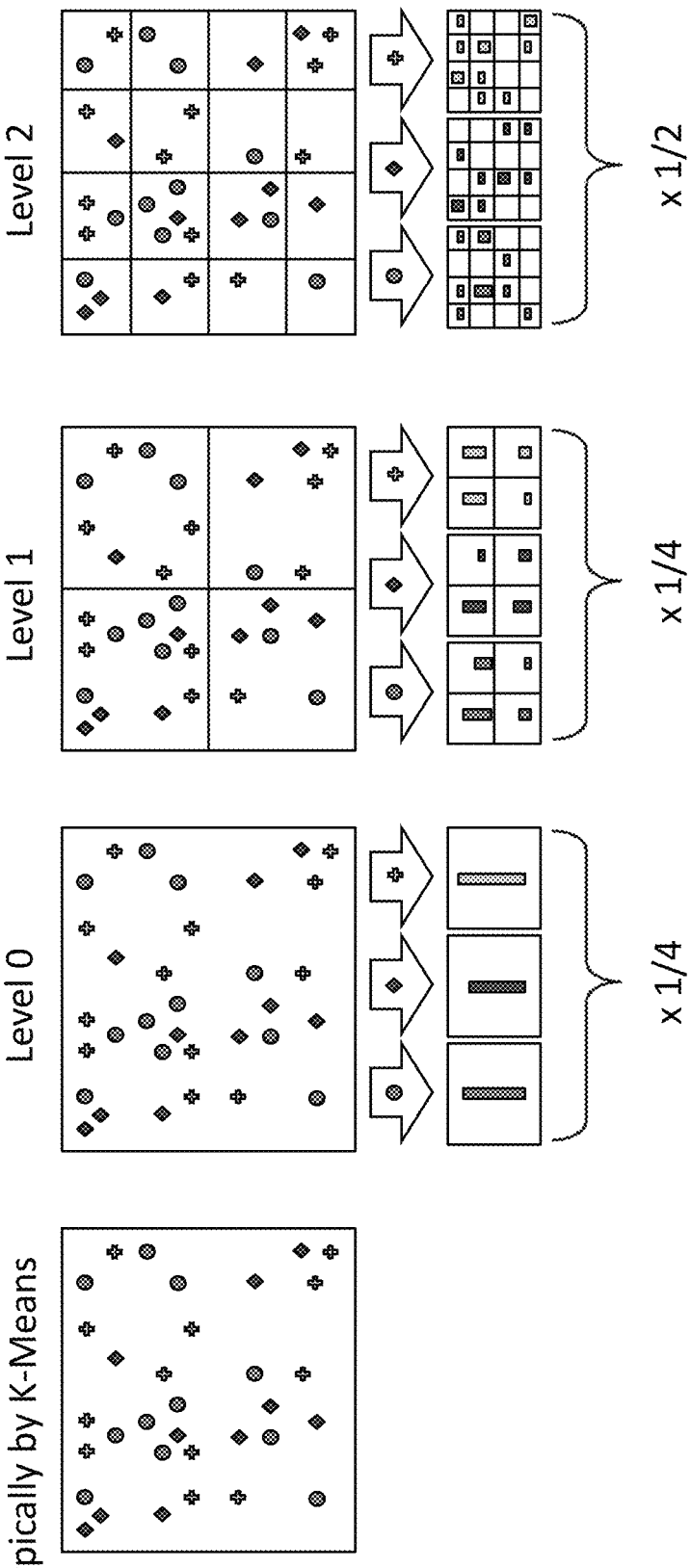
FIG. 4 shows a schematic diagram illustrating an exemplary embodiment of feature pooling by SPM.

3. Construct spatial histogram for SPM (Lazebnik et al, 2006). This is done by repeatedly subdividing an image and computing the histograms of different sparse tissue morphometric types over the resulting subregions (FIG. 4). As a result, the spatial histogram, H, is formed by concatenating the appropriately weighted histograms of all sparse tissue morphometric types at all resolutions, $$H_0 = H_0^0; H_l = (H_l^1, \cdots, H_l^{4^l}), 1 \leq l \leq L \quad (3)$$

$$H = \left(\frac{1}{2^L} H_0, \frac{1}{2^L} H_1, \cdots, \frac{1}{2^{L-l+1}} H_l, \cdots, \frac{1}{2} H_L\right)$$

where (·) is the vector concatenation operator, $l \in \{0, \ldots, L\}$ is the resolution of the image pyramid, $H_l$ is the concatenation of histograms for all image grids at certain resolution, l.

4. Transfer a $\chi^2$ support vector machine (SVM) into a linear SVM based on a homogeneous kernel map (Vedaldi et al, 2012). In practice, the intersection kernel and $\omega^2$ kernel have been found to be the most suitable for histogram representations (Yang et al, 2009). In this step, a homogenous kernel map is applied to approximate the $\chi^2$ kernel, which enables the efficiency by adopting learning methods for linear kernels, i.e., linear SVM.

5. Construct multi-class linear SVM for classification. In our implementation, the classifier is trained using the LIBLINEAR (Fan et al, 2008) package.

Experiments and Results

In this experiment, we evaluated four classification methods on two distinct datasets, curated from (i) Glioblastoma Multiforme (GBM) and (ii) Kidney Renal Clear Cell Carcinoma (KIRC) from TCGA, which were publicly available from the National Institutes of Health (NIH) repository. The four methods are:

1. PSDSPM: the nonlinear kernel SPM that uses spatial-pyramid histograms of sparse tissue morphometric types;
2. PSD (Kavukcuoglu et al, 2008): the sparse tissue morphometric features with max-pooling strategy, and RBF kernels;
3. ScSPM (Yang et al, 2009): the linear SPM that uses linear kernel on spatial-pyramid pooling of SIFT sparse codes;
4. KSPM (Lazebnik et al, 2006): the nonlinear kernel SPM that uses spatial-pyramid histograms of SIFT features and $\chi^2$ kernels;

In the implementation of ScSPM and KSPM, the dense SIFT features were extracted on 16×16 patches sampled from each image on a grid with step-size 8 pixels.

For both PSDSPM and PSD, the sparse constraint parameter $\chi$ was fixed to be 0.3, image patch size to be 20×20, and the number of basis functions was set to be 1024. These values were derived empirically to achieve the best performance. For ScSPM, the sparse constraint parameter $\chi$ was fixed to be 0.15, and also derived empirically to achieve the best performance. For both PSDSPM and KSPM, standard K-means clustering was used for the construction of the dictionary, whereas the elements were randomly initialized and iteratively refined in the Euclidean space. Additionally, for PSDSPM, ScSPM and KSPM, the level of the pyramid was fixed to be 3, and we used linear SVM for classification. For PSD nonlinear SVM with RBF kernel was used for classification. All experimental processes were repeated 10 times with randomly selected training and testing images. The final results were reported as the mean and standard deviation of the classification rates, which was defined as the average classification accuracy among different classes.

GBM Dataset

Figure 5:
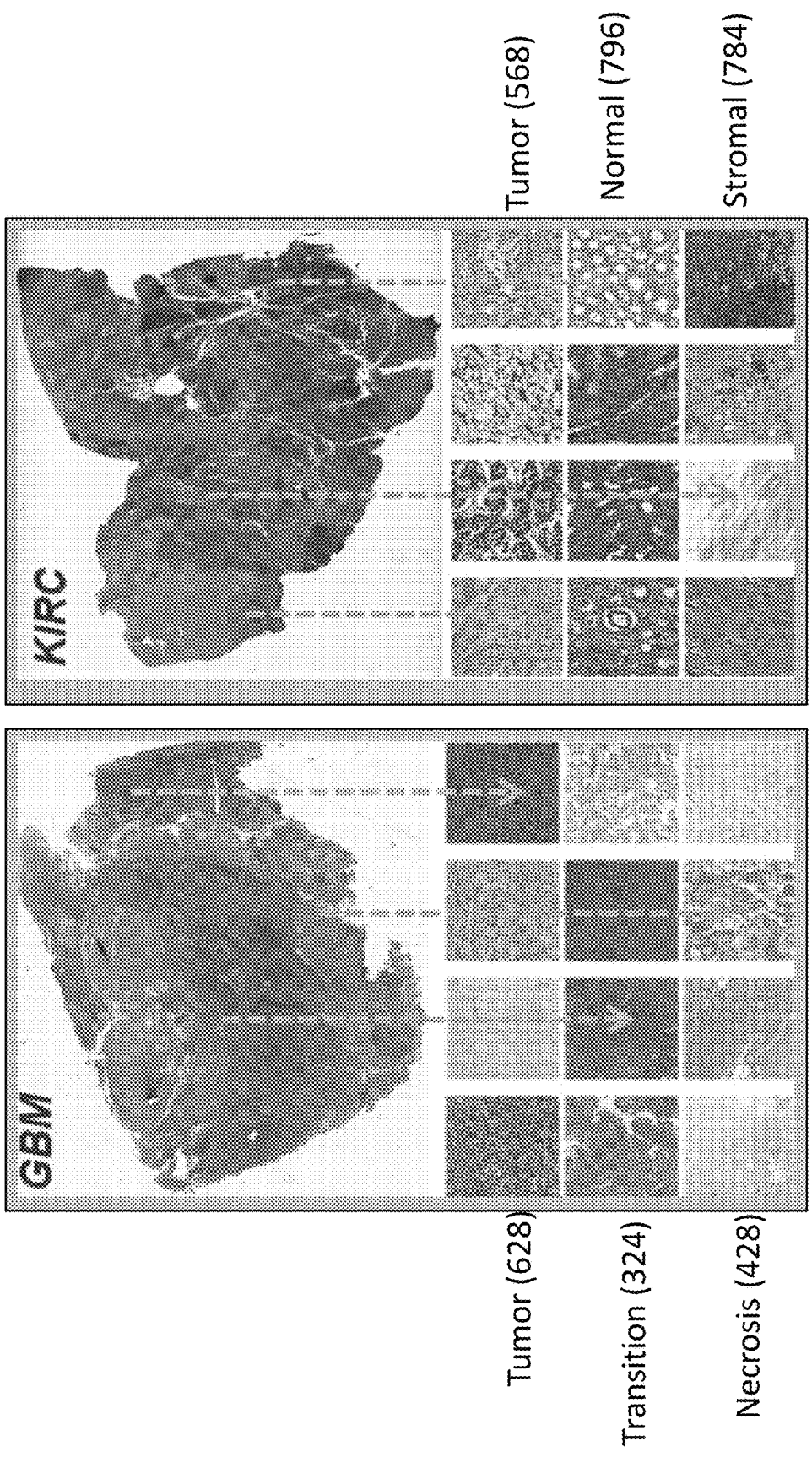
FIG. 5 shows examples of whole slide images of two tumor cohorts (GBM and KIRC) from The Cancer Genome Atlas (TCGA). The bottom rows indicate pinhole views of microanatomy and distinct regions of histopathology.
Figure 6:
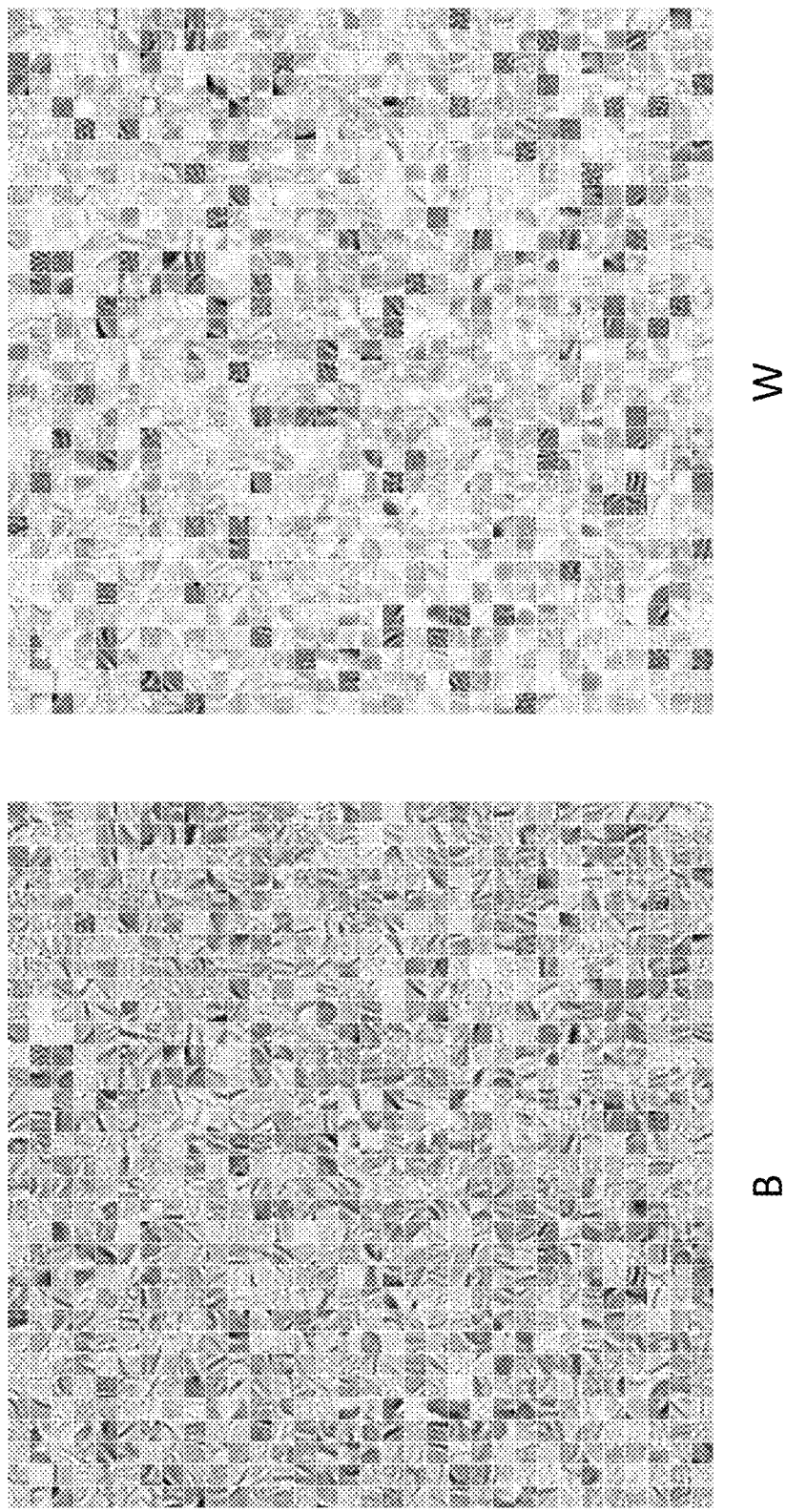
FIG. 6 shows learned dictionary and filters for the GBM cohort in an exemplary embodiment.
Figure 7:
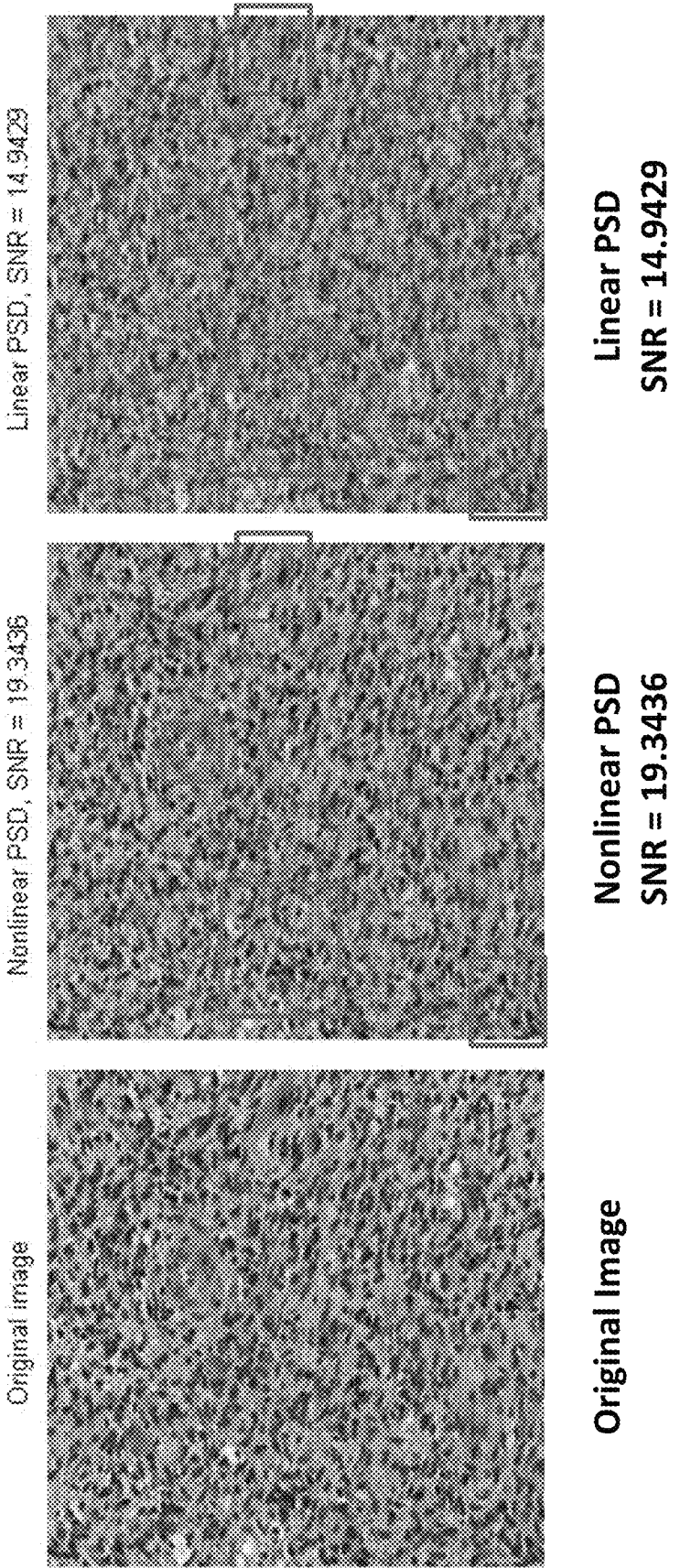
FIG. 7 shows the reconstruction of an image in an exemplary embodiment.
Figure 8:
FIG. 8 shows classification of regions of histopathology and microanatomy in whole slide images in an exemplary embodiment.

The GBM dataset contained 3 classes: Tumor, Necrosis, and Transition to Necrosis, which were curated from WSI scanned with a 20× objective. Examples can be found in FIG. 5. The number of images per category was 628, 428 and 324, respectively. Most images had a pixel density of 1000×1000 pixels. In this experiment, we trained on 40, 80 and 160 images per category and tested on the rest, with three different dictionary sizes: 256, 512 and 1024 (FIGS. 6-8). Detailed comparisons are shown in Table 1.

TABLE 1

Performance of different methods on the GBM dataset.

| | Method | DictionarySize = 256 | DictionarySize = 512 | Dictionary Size = 1024 |
|---|---|---|---|---|
| 160 training | PSDSPM | 91.02 ± 1.89 | 91.41 ± 0.95 | 91.20 ± 1.29 |
| | PSD [1] | 86.07 ± 1.42 | 86.32 ± 1.14 | 86.15 ± 1.33 |
| | ScSPM [12] | 79.58 ± 0.61 | 81.29 ± 0.86 | 82.36 ± 1.10 |
| | KSPM [2] | 85.00 ± 0.79 | 86.47 ± 0.55 | 86.81 ± 0.45 |
| 80 training | PSDSPM | 88.63 ± 0.91 | 88.91 ± 1.18 | 88.64 ± 1.08 |
| | PSD [1] | 81.73 ± 0.98 | 82.08 ± 1.23 | 81.55 ± 1.17 |
| | ScSPM [12] | 77.65 ± 1.43 | 78.31 ± 1.13 | 81.00 ± 0.98 |
| | KSPM [2] | 83.81 ± 1.22 | 84.32 ± 0.67 | 84.49 ± 0.34 |
| 40 training | PSDSPM | 84.06 ± 1.16 | 83.72 ± 1.46 | 83.40 ± 1.14 |
| | PSD [1] | 78.28 ± 1.74 | 78.15 ± 1.43 | 77.97 ± 1.65 |
| | ScSPM [12] | 73.60 ± 1.68 | 75.58 ± 1.29 | 76.24 ± 3.05 |
| | KSPM [2] | 80.54 ± 1.21 | 80.56 ± 1.24 | 80.46 ± 0.56 |

KIRC Dataset

The KIRC dataset contained 3 classes: Tumor, Normal, and Stromal, which were curated from WSI scanned with a 40× objective. Examples can be found in FIG. 5. The number of images per category was 568, 796 and 784, respectively. Most images had a pixel density of 1000×1000 pixels. In this experiment, we trained on 70, 140 and 280 images per category and tested on the rest, with three different dictionary sizes: 256, 512 and 1024. Detailed comparisons are shown in Table 2.

TABLE 2

Performance of different methods on the KIRC dataset.

| | Method | DictionarySize = 256 | DictionarySize = 512 | DictionarySize = 1024 |
|---|---|---|---|---|
| 280 training | PSDSPM | 97.19 ± 0.49 | 97.27 ± 0.44 | 97.08 ± 0.45 |
| | PSD [1] | 90.72 ± 1.32 | 90.18 ± 0.88 | 90.43 ± 0.80 |
| | ScSPM [12] | 94.52 ± 0.44 | 96.37 ± 0.45 | 96.81 ± 0.50 |
| | KSPM [2] | 93.55 ± 0.31 | 93.76 ± 0.27 | 93.90 ± 0.19 |
| 140 training | PSDSPM | 96.80 ± 0.75 | 96.52 ± 0.76 | 96.55 ± 0.84 |
| | PSD [1] | 88.75 ± 0.37 | 88.93 ± 0.45 | 87.98 ± 0.86 |
| | ScSPM [12] | 93.46 ± 0.55 | 95.68 ± 0.36 | 96.76 ± 0.63 |
| | KSPM [2] | 92.50 ± 1.12 | 93.06 ± 0.82 | 93.26 ± 0.68 |
| 70 training | PSDSPM | 95.12 ± 0.54 | 95.13 ± 0.51 | 95.09 ± 0.40 |
| | PSD [1] | 87.56 ± 0.78 | 87.93 ± 0.67 | 87.13 ± 0.97 |
| | ScSPM [12] | 91.93 ± 1.00 | 93.67 ± 0.72 | 94.86 ± 0.86 |
| | KSPM [2] | 90.78 ± 0.98 | 91.34 ± 1.13 | 91.59 ± 0.97 |

The experiments, conducted on the two distinct datasets of vastly different tumor types indicated that, 1. SPM improves the performance for tissue classification. As shown in Tables 1 and 2, PSDSPM consistently outperforms PSD, which demonstrates the effectiveness of SPM for tissue classification. The improvement of performance may be due to the local histogramming involved in SPM, which provides some sort of tissue morphometric context at various locations and scales. In practice, the context information is widely adopted by well-trained pathologists for diagnosis.

2. Features from unsupervised feature learning are more tolerant to batch effect than human engineered features for tissue classification. As shown in Tables 1 and 2, PSDSPM consistently outperformed KSPM. Since the only difference between these two approaches is that PSDSPM utilize features from unsupervised feature learning, while KSPM is based on human engineered features (SIFT), it's possible that given the large amounts of technical and biological variations in the TCGA datasets, features from unsupervised feature learning are more tolerant to batch effect than human engineered features for tissue classification.

As a result, the combination of unsupervised feature learning and SPM leads to an approach with following merits, 1. Extensibility to different tumor types. Tables 1 and 2 indicate that, embodiments of the present method consistently outperform methods previously described (Yang et al, 2009, Lazebnik et al, 2006, Kavukcuoglu et al, 2008). However, due to the poor generalization ability of human engineered feature (SIFT), KSPM and ScSPM appear to be tumor-type dependent. Since GBM and KIRC are two vastly different tumor types with significantly different signatures, the consistency in performance may allow extensibility to analysis of different tumor types.

2. Robustness in the presence of large amounts of technical and biological variations. For the GBM dataset, shown in Table 1, the performance of PSDSPM, with 80 training samples per category, is better than the performance of methods previously described (Yang et al, 2009, Lazebnik et al, 2006, Kavukcuoglu et al, 2008) with 160 training samples per category. For the KIRC dataset, shown in Table 2, the performance of PSDSPM, with 140 training samples per category, is either better than or comparable to the performance of methods previously described (Yang et al, 2009, Lazebnik et al, 2006, Kavukcuoglu et al, 2008) with 280 training samples per category. Since TCGA datasets contain large amount of technical and biological variations (Dalton et al, 2000), these results indicate the robustness of this approach, which improved the scalability with varying training sample size, and the reliability of further analysis on large cohort of WSI.

In the present approach, the choice of PSD for unsupervised feature learning, over others (e.g., Reconstruction Independent Subspace Analysis (RISA) (Le et al, 2012)), may be due to its effectiveness and efficiency in a feedforward fashion, which is demonstrated by an experimental comparison with RISA, based on the dataset and protocols in (Le et al, 2012), as shown in Table 3.

TABLE 3

Comparison of performance among PSDSPM, and RISA.

| PSDSPM | PSD | RISA |
|---|---|---|
| 96.50 | 95.05 | 91.10 |

Due to the robustness of unsupervised feature learning and the effectiveness of the SPM framework, embodiments of the present method outperformed traditional ones which were typically based on human engineered features. The most encouraging results are that the methods were highly i)

extensible to different tumor types; ii) robust in the presence of large amounts of technical and biological variations; and iii) scalable with varying training sample sizes.

Example 2: Classification of Tumor Histology Via Morphometric Context

In this example (Reference: H Chang, A D Borowski, P T Spellman, and B Parvin, "Classification of tumor histopathology via morphometric context," CVPR 2013), we proposed two variations of tissue classification methods based on representations of morphometric context (one variation is shown in FIG. 2), which were constructed from nuclear morphometric statistics of various locations and scales based on spatial pyramid matching (SPM) (Lazebnik et al, 2006). Due to the effectiveness of our representations, our methods achieved high performance even with a small number of training samples across different segmentation strategies and independent datasets of tumors. The performance was further complemented by the fact that one of the methods had a superior result with linear classifiers. These characteristics dramatically improved the (i) effectiveness of our techniques when applied to a large cohort, and (ii) extensibility to other cell-based assays.

A recent study indicates that detailed segmentation and multivariate representation of nuclear features from H&E stained sections can predict DCIS recurrence (Axelrod et al, 2008) in patients with more than one nuclear grade.

In the context of image categorization research, the traditional bag of features (BoF) model has been widely studied and improved through different variations, e.g., modeling of co-occurrence of descriptors based on generative methods (Bosch et al, 2008, Boiman et al, 2008, Li et al, 2005, Quelhas et al, 2005), improving dictionary construction through discriminative learning (Elad et al, 2006, Moosmann et. al., 2006), modeling the spatial layout of local descriptors based on spatial pyramid matching kernel (SPM) (Lazebnik et al, 2006).

Approach

Figure 9A:
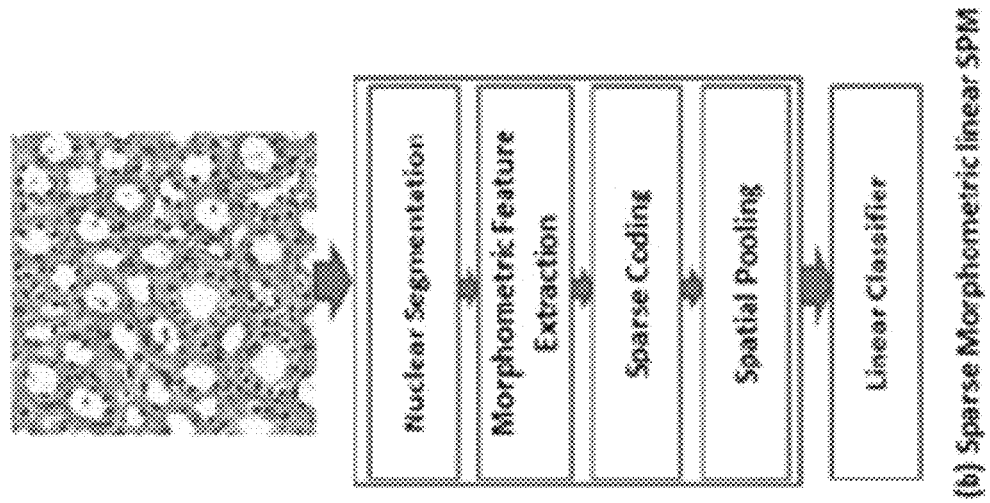
FIGS. 9A and 9B show flow charts illustrating exemplary embodiments of: morphometric nonlinear kernel SPM (FIG. 9A) and sparse morphometric linear SPM (FIG. 9B). In both approaches, the nuclear segmentation could be based on any of the existing methods.
Figure 9B:
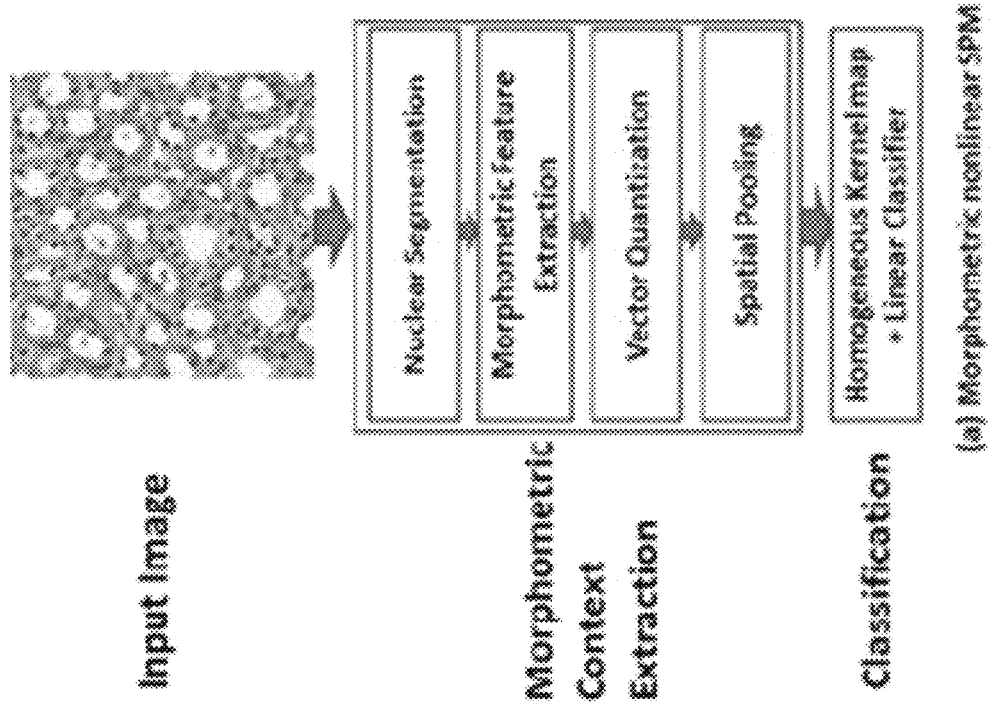

The computational workflows for embodiments of the proposed methods are shown in FIG. 9, where the nuclear segmentation can be based on any of the existing methods for delineating nuclei from background. For some tissue images and their corresponding nuclear segmentation, let:

1. M be the total number of segmented nuclei;
2. N be the number of morphometric descriptors extracted from each segmented nucleus, e.g. nuclear size, and nuclear intensity;
3. X be the set of morphometric descriptors for all segmented nuclei, where $X=[x_1, \ldots, x_M]^T \in \mathbb{R}^{M \times N}$.

Our proposed methods are described in detail as follows.

Morphometric Nonlinear Kernel SPM (MKSPM)

In this approach, we utilize the nuclear morphometric information within the SPM framework to construct the morphometric context at various locations and scales for tissue image representation and classification. It consists of the following steps:

1. Construct dictionary (D), where $D=[d1; \ldots; dK]^T$ are the K nuclear morphometric types to be learned by the following optimization:

$$\min_{D,Z} \sum_{m=1}^{M} \|x_m - z_m D\|^2 \qquad (4)$$

subject to card $(z_m) = 1$, $|z_m| = 1$, $z_m \geq 0$, $\forall m$ where $Z=[z_1, \ldots, z_M]^T$ indicates the assignment of the nuclear morphometric type, card($z_m$) is a cardinality constraint enforcing only one nonzero element of $z_m$, $z_m \geq 0$ is a non-negative constraint on the elements of $z_m$, and $|z_m|$ is the L1-norm of $z_m$. During training, Equation 4 is optimized with respect to both Z and D; in the coding phase, for a new set of X, the learned D is applied, and Equation 4 is optimized with respect to Z only.

2. Construct spatial histogram as the descriptor for the morphometric context for SPM (Lazebnik et al, 2006). This is done by repeatedly subdividing an image and computing the histograms of different nuclear morphometric types over the resulting subregions. As a result, the spatial histogram, H, is formed by concatenating the appropriately weighted histograms of all nuclear morphometric types at all resolutions. The SPM kernel is then implemented as a single histogram intersection as follows, $$\kappa(H_i, H_j) = \sum_{q=1}^{Q} \min(H_i(q), H_j(q)) \qquad (5)$$

where $H_i$ and $H_j$ are the spatial histograms for image $I_i$ and $I_j$ respectively, and Q is the length of the spatial histogram. For more details about SPM, please refer to Lazebnik et al, 2006, and Grauman et al, 2005.

3. Transfer a $\chi^2$ support vector machine (SVM) into a linear SVM based on a homogeneous kernel map (Vedaldi et al, 2012). In practice, the intersection kernel and $\chi^2$ kernel have been found to be the most suitable for histogram representations (Yang et al, 2009). In this step, a homogenous kernel map is applied to approximate the $\chi^2$ kernels, which enables the efficiency by adopting learning methods for linear kernels, e.g., linear SVM. For more details about the homogeneous kernel map, please refer to Vedaldi et al, 2012.

4. Construct multi-class linear SVM for classification. In our implementation, the classifier is trained using the LIBLINEAR (Fan et al, 2008) package.

Sparse Morphometric Linear SPM (SMLSPM)

As described below one embodiment is a system and method that utilizes sparse coding of the nuclear morphometric information within a linear SPM framework to construct the morphometric context at various locations and scales for tissue image representation and classification. It can include the following steps:

1. Construct dictionary (D), where $D=[d_1, \ldots, d_K]^T$ are the K nuclear morphometric types to be learned by the following sparse coding optimization:

$$\min_{D,Z} \sum_{m=1}^{M} \|x_m - z_m D\|^2 + \lambda |z_m| \qquad (5)$$

subject to $\|d_k\| \leq 1$, $\forall k$ where $\|d_k\|$ is a unit L2-norm constraint for avoiding trivial solutions, and $|z_m|$ is the L1-norm enforcing the sparsity of $z_m$. During training, Equation 5 is optimized with respect to both Z and D; in the coding phase, the learned D will be applied to a new set of X, with Equation 5 optimized with respect to Z only.

2. Construct spatial pyramid representation as the descriptor of morphometric context for the linear SPM (Yang et al, 2009). Let Z be the sparse codes calculated through Equation 5 for a descriptor set X. Based on pre-learned and fixed dictionary D, the image descriptor is computed based on a predetermined pooling function as follows, $$f = \mathbb{P}(Z) \qquad (6)$$

In our implementation, P is selected to be the max pooling function on the absolute sparse codes $$f_j = \max\{|z_{1j}|, |z_{2j}|, \ldots, |z_{Mj}|\} \qquad (7)$$

where $f_j$ is the j-th element of f, $z_{ij}$ is the matrix element at i-th row and j-th column of Z, and M is the number of nuclei in the region. The choice of max pooling procedure is justified by biophysical evidence in the visual cortex (Serre et al, 2005), algorithms in image categorization (Yang et al, 2009), and our experimental comparison with other common pooling strategies (see Table 10). Similar to the construction of SPM, the pooled features from various locations and scales are then concatenated to form a spatial pyramid representation of the image, and a linear SPM kernel is applied as follows, $$\kappa(f_i, f_j) = f_i^T f_j = \sum_{l=0}^{2} \sum_{s=1}^{2^l} \sum_{t=1}^{2^l} \langle f_i^l(s, t), f_j^l(s, t) \rangle \qquad (8)$$

where $f_i$ and $f_j$ are spatial pyramid representations for image $I_i$ and $I_j$, respectively, $(f_i; f_j) = f_i^T f_j$, and $f_i^l(s, t)$ and $f_j^l(s, t)$ are the max pooling statistics of the sparse codes in the (s; t)-th segment of image $I_i$ and $I_j$ in the scale level l, respectively.

3. Construct multi-class linear SVM for classification. In our implementation, the classifier is trained using the LIBLINEAR (Fan et al, 2008) package.

Experiments and Results

We have evaluated five classification methods on two distinct datasets, curated from (i) Glioblastoma Multiforme (GBM) and (ii) Kidney Renal Clear Cell Carcinoma (KIRC) from The Cancer Genome Atlas (TCGA), which are publicly available from the NIH (National Institute of Health) repository. The five methods are:

1. SMLSPM: the linear SPM that uses linear kernel on spatial-pyramid pooling of morphometric sparse codes;
2. MKSPM: the nonlinear kernel SPM that uses spatialpyramid histograms of morphometric features and 2 kernels;
3. ScSPM (Yang et al, 2009): the linear SPM that uses linear kernel on spatial-pyramid pooling of SIFT sparse codes;
4. KSPM (Lazebnik et al, 2006): the nonlinear kernel SPM that uses spatial-pyramid histograms of SIFT features and $\chi^2$ kernels;
5. CTSPM: the nonlinear kernel SPM that uses spatialpyramid histograms of color and texture features and $\chi^2$ kernels;

In the implementations of SMLSPM and MKSPM, morphometric features were extracted and normalized independently with zero mean and unit variance based on three different segmentation strategies:

1. MRGC (Chang et al, 2012): A multi-reference graph cut approach for nuclear segmentation in histology tissue sections;
2. SRCD (Chang et al, 2011): A single-reference color decomposition approach for nuclear segmentation in histology tissue sections;
3. OTGR: A simple Otsu thresholding (Otsu, 1979) approach for nuclear segmentation in histology tissue sections. In our implementation, nuclear mask was generated by applying Otsu thresholding on gray-scale image, and refined by geometric reasoning (Wen et al, 2009). The same refinement was also used in the MRGC and SRCD approaches.

A comparison of the segmentation performance, for the above methods, is quoted from (Chang et al, 2012), and listed in Table 4, and the computed morphometric features are listed in Table 5.

TABLE 4

Comparison of average segmentation performance among MRGC (Chang et al, 2012), SRCD (Chang et al, 2011), and OTGR.

| Approach | Precision | Recall | F-Measure |
|---|---|---|---|
| MRGC | 0.75 | 0.85 | 0.797 |
| SRCD | 0.63 | 0.75 | 0.685 |
| OTGR | NA | NA | NA |

Note:
1) the information above is quoted from (Chang et al, 2012);
2) the OTGR performance is not listed due to the unavailability of the data used in (Chang et al, 2012), however, based on our experience with histological sections, simple thresholding methods typically generate less favorable results than sophisticated ones.

TABLE 5

Morphometric features used in SMLSPM and MKSPM, where the curvature values were computed with σ = 2: 0, and the nuclear background is defined to be outside the nuclear region, but inside the bounding box of nuclear boundary.

| Feature | Description |
|---|---|
| Nuclear Size | #pixels of a segmented nucleus |
| Nuclear Voronoi Size | #pixels of the voronoi region, where the segmented nucleus resides |
| Aspect Ratio | Aspect ratio of the segmented nucleus |
| Major Axis | Length of Major axis of the segmented nucleus |
| Minor Axis | Length of Minor axis of the segmented nucleus |
| Rotation | Angle between major axis and x axis of the segmented nucleus |
| Bending Energy | Mean squared curvature values along nuclear contour |
| STD Curvature | Standard deviation of absolute curvature values along nuclear contour |
| Abs Max Curvature | Maximum absolute curvature values along nuclear contour |
| Mean Nuclear Intensity | Mean intensity in nuclear region measured in gray scale |
| STD Nuclear Intensity | Standard deviation of intensity in nuclear region measured in gray scale |
| Mean Background Intensity | Mean intensity of nuclear background measured in gray scale |
| STD Background Intensity | Standard deviation of intensity of nuclear background measured in gray scale |
| Mean Nuclear Gradient | Mean gradient within nuclear region measured in gray scale |
| STD Nuclear Gradient | Standard deviation of gradient within nuclear region measured in gray scale |

In the implementation of ScSPM and KSPM, the dense SIFT features were extracted on 16×16 patches sampled from each image on a grid with stepsize 8 pixels. In the implementation of CT SPM, color features were extracted in the RGB color space; texture features were extracted via steerable filters (Young et al, 2001) with 4 directions and 5 scales ($\sigma \in \{1; 2; 3; 4; 5\}$) on the grayscale image; and the feature vector was a concatenation of texture and mean color on 20×20 patches.

For both SMLSPM and ScSPM, we fixed the sparse constraint parameter $\lambda$ to be 0.15, empirically, to achieve the best performance. For MKSPM, KSPM and CT SPM, we used standard K-means clustering for the construction of dictionaries. Additionally, for all five methods, we fixed the level of pyramid to be 3, and used linear SVM for classification. All experimental processes were repeated 10 times with randomly selected training and testing images. The final results were reported as the mean and standard deviation of the classification rates.

GBM Dataset

The GBM dataset contains 3 classes: Tumor, Necrosis, and Transition to Necrosis, which were curated from whole slide images (WSI) scanned with a 20× objective (0.502 micron/pixel). Examples can be found in FIG. 5. The number of images per category is 628, 428 and 324, respectively. Most images are 1000×1000 pixels. In this experiment, we trained on 40, 80 and 160 images per category and tested on the rest, with three different dictionary sizes: 256, 512 and 1024. Detailed comparisons are shown in Table 6. For SMLSPM and MKSPM, we also evaluated the performance based on three different segmentation strategies: MRGC, SRCD and OTGR. Detailed comparisons are shown in Table 7.

TABLE 6

Performance of different methods on the GBM dataset, where SMLSPM and MKSPM were evaluated based on the segmentation method: MRGC (Chang et al, 2012).

| | Method | DictionarySize = 256 | DictionarySize = 512 | DictionarySize = 1024 |
|---|---|---|---|---|
| 160 training | SMLSPM | 92.35 ± 0.83 | 92.57 ± 0.91 | 92.91 ± 0.84 |
| | MKSPM | 91.85 ± 0.98 | 91.95 ± 0.83 | 91.76 ± 0.97 |
| | ScSPM [28] | 79.58 ± 0.61 | 81.29 ± 0.86 | 82.36 ± 1.10 |
| | KSPM [18] | 85.00 ± 0.79 | 86.47 ± 0.55 | 86.81 ± 0.45 |
| | CTSPM | 78.61 ± 1.33 | 78.71 ± 1.18 | 78.69 ± 0.81 |
| 80 training | SMLSPM | 90.82 ± 1.28 | 90.29 ± 0.68 | 91.08 ± 0.69 |
| | MKSPM | 89.83 ± 1.15 | 89.78 ± 1.09 | 89.44 ± 1.20 |
| | ScSPM [28] | 77.65 ± 1.43 | 78.31 ± 1.13 | 81.00 ± 0.98 |
| | KSPM [18] | 83.81 ± 1.22 | 84.32 ± 0.67 | 84.49 ± 0.34 |
| | CTSPM | 75.93 ± 1.18 | 76.06 ± 1.52 | 76.19 ± 1.33 |
| 40 training | SMLSPM | 88.05 ± 1.38 | 87.88 ± 1.08 | 88.54 ± 1.42 |
| | MKSPM | 87.38 ± 1.38 | 87.06 ± 1.52 | 86.37 ± 1.73 |
| | ScSPM [28] | 73.60 ± 1.68 | 75.58 ± 1.29 | 76.24 ± 3.05 |
| | KSPM [18] | 80.54 ± 1.21 | 80.56 ± 1.24 | 80.46 ± 0.56 |
| | CTSPM | 73.10 ± 1.51 | 72.90 ± 1.09 | 72.65 ± 1.41 |

TABLE 7

Performance of SMLSPM and MKSPM on the GBM dataset based on three different segmentation approaches, where the number of training images per category was fixed to be 160, and the dictionary sizes for SMLSPM and MKSPM were fixed to be 1024 and 512, respectively, to achieve optimal performance.

| | MKGC | SRCD | OTGR |
|---|---|---|---|
| SMLSPM | 92.91 ± 0.84 | 93.56 ± 0.91 | 91.03 ± 1.15 |
| MKSPM | 91.95 ± 0.83 | 93.33 ± 0.90 | 90.94 ± 0.87 |

KIRC Dataset

The KIRC dataset contains 3 classes: Tumor, Normal, and Stromal, which were curated from whole slide images (WSI) scanned with a 40× objective (0.252 micron/pixel). Examples can be found in FIG. 5. The number of images per category was 568, 796 and 784, respectively. Most images have a pixel density of 1000×1000 pixels. In this experiment, 70, 140 and 280 images per category were used for training and tested on the rest, with three different dictionary sizes: 256, 512 and 1024. Detailed comparisons are shown in Table 8. For SMLSPM and MKSPM, the performance was evaluated based on three different segmentation strategies: MRGC, SRCD and OTGR. Detailed comparisons are shown in Table 9.

TABLE 8

Performance of different methods on the KIRC dataset, where SMLSPM and MKSPM were evaluated based on the segmentation method: MRGC.

| | Method | DictionarySize = 256 | DictionarySize = 512 | DictionarySize = 1024 |
|---|---|---|---|---|
| 280 training | SMLSPM | 98.15 ± 0.46 | 98.50 ± 0.42 | 98.21 ± 0.44 |
| | MKSPM | 97.37 ± 0.49 | 97.34 ± 0.48 | 97.22 ± 0.50 |
| | ScSPM [28] | 94.52 ± 0.44 | 96.37 ± 0.45 | 96.81 ± 0.50 |
| | KSPM [18] | 93.55 ± 0.31 | 93.76 ± 0.27 | 93.90 ± 0.19 |
| | CTSPM | 87.45 ± 0.59 | 87.95 ± 0.49 | 88.53 ± 0.49 |
| 140 training | SMLSPM | 97.40 ± 0.50 | 97.98 ± 0.35 | 97.35 ± 0.48 |
| | MKSPM | 96.56 ± 0.53 | 96.54 ± 0.50 | 96.41 ± 0.56 |
| | ScSPM [28] | 93.46 ± 0.55 | 95.68 ± 0.36 | 96.76 ± 0.63 |
| | KSPM [18] | 92.50 ± 1.12 | 93.06 ± 0.82 | 93.26 ± 0.68 |
| | CTSPM | 86.55 ± 0.99 | 86.40 ± 0.54 | 86.49 ± 0.58 |
| 70 training | SMLSPM | 96.20 ± 0.85 | 96.37 ± 0.85 | 96.19 ± 0.62 |
| | MKSPM | 95.62 ± 0.62 | 95.47 ± 0.71 | 95.27 ± 0.72 |
| | ScSPM [28] | 91.93 ± 1.00 | 93.67 ± 0.72 | 94.86 ± 0.86 |
| | KSPM [18] | 90.78 ± 0.98 | 91.34 ± 1.13 | 91.59 ± 0.97 |
| | CTSPM | 84.76 ± 1.32 | 84.29 ± 1.53 | 83.71 ± 1.42 |

TABLE 9

Performance of SMLSPM and MKSPM on the KIRC dataset based on three different segmentation approaches, where the number of training images per category was fixed to be 280, and the dictionary sizes for both SMLSPM and MKSPM were fixed to be 512, to achieve the optimal performance.

| | MRGC | SRCD | OTGR |
|---|---|---|---|
| SMLSPM | 98.50 ± 0.42 | 98.30 ± 0.34 | 97.66 ± 0.49 |
| MKSPM | 97.34 ± 0.48 | 97.66 ± 0.45 | 95.90 ± 0.54 |

The experiments, conducted on two distinct datasets, demonstrate the following merits.

1. Extensibility to different tumor types. Tables 6 and 8 indicate that, with the exception of (KIRC; 140 training; Dictionary size 1024), embodiments of the present methods consistently outperform ScSPM, KSPM and CTSPM with different combinations of experimental factors (e.g., training sample size, dictionary size). However, KSPM and ScSPM appear to be tumor-type dependent, as KSPM outperforms ScSPM on GBM while ScSPM outperforms KSPM on KIRC. Since GBM and KIRC are two vastly different tumor types with significantly different signatures, the consistency in performance may assure extensibility to different tumor types.

2. Robustness in the presence of large amounts of technical and biological variations. With respect to the GBM dataset, shown in Table 6, the performance of the methods described above, based on 40 training samples per category, was better than the performance of ScSPM, KSPM and CTSPM based on 160 training samples per category. With respect to the KIRC dataset, shown in Table 8, the performance of the methods described above, based on 70 training samples per category, was comparable to the performance of ScSPM, KSPM and CTSPM based on 280 training samples per category. Thus, the present system and method required many fewer training sets to achieve the same outcomes as the earlier systems. Given the fact that TCGA datasets contain a large amount of technical and biological variations (Kothari et al, 2012, Le et al, 2012), these results indicate the robustness of the present morphometric context representation, which dramatically improved the reliability of the present approaches.

3. Invariance to different segmentation algorithms. Tables 7 and 9 indicate that the performance of the present approaches was almost invariant to different segmentation processes, given the fact that the segmentation performance itself varied, as shown in Table 4. Even with the simplest segmentation strategy OTGR, SMLSPM was found to outperform that method in prior publications (Yang et al, 2009, Lazebnik et al, 2006) on both datasets, and MRSPM outperformed those methods in prior publications (Yang et al, 2009, Lazebnik et al, 2006) on the GBM dataset, while generating comparable results on the KIRC dataset. Given the fact that, in a lot of studies, both nuclear segmentation and tissue classification were necessary components, the use of pre-computed morphometric features dramatically improved the system's efficiency by avoiding extra feature extraction steps. For example, in one implementation of the present system and method, SIFT costs 1.5 sec/block (a block is a 1000×1000 image decomposed from a whole slide tissue section). For the whole GBM dataset (~600,000 blocks), by avoiding SIFT operation, the process saves approximately 10 days for processing.

4. Scalability of training and high speed testing for SMLSPM. The present systems and methods demonstrate that the morphometric context representation in SMLSPM works well with linear SVMs, which dramatically improved the scalability of training and the speed of testing. This is advantageous when analyzing a large cohort of whole slide images.

To study the impact of pooling strategies on the SMLSPM method, we also provide an experimental comparison among max pooling and two other common pooling methods, which are defined as follows, $$Sqrt: f_j = \sqrt{\frac{1}{M}\sum_{i=1}^{M} z_{ij}^2} \quad (9)$$

$$Abs: f_j = \frac{1}{M}\sum_{i=1}^{M} |z_{ij}|$$

where the meaning of the notations are the same as in Equation 7. As shown in Table 10, the max pooling strategy outperforms the other two, which is probably due to its robustness to local translations.

TABLE 10

Comparison of performance for SMLSPM using different pooling strategies on the GBM and KIRC datasets. For GBM, the number of training images per category was fixed to be 160, and the dictionary size was fixed to be 1024; for KIRC, the number of training images per category was fixed to be 280, and the dictionary size was fixed to be 512.

|  | Sqrt | Abs | Max |
| --- | --- | --- | --- |
| GBM | 92.85 ± 0.94 | 90.90 ± 1.11 | 92.91 ± 0.84 |
| KIRC | 97.60 ± 0.49 | 97.49 ± 0.38 | 98.50 ± 0.42 |

The experiments above also indicate an improved performance of SMLSPM over MKSPM; this is probably due to the following factors: i) sparse coding has much less quantization errors than vector quantization; ii) the statistics derived by max pooling are more robust to local translations compared with the average pooling in the histogram representation.

By modeling the context of the morphometric information, these methods outperformed traditional ones which were typically based on pixel- or patch-level features. These data demonstrate that embodiments of the invention are highly i) extensible to different tumor types; ii) robust in the presence of large amounts of technical and biological variations; iii) invariant to different segmentation algorithms; and iv) scalable to extremely large training and testing sample sizes. Due to i) the effectiveness of our morphometric context representations; and ii) the important role of cellular context for the study of different cell assays, embodiments can also be extended to image classification tasks for different cell assays.

Example 3: Classification of Histology Sections Via Multispectral Convolutional Sparse Coding This example (uses a multispectral unsupervised feature learning model (MCSCSPM) for tissue classification, based on convolutional sparse coding (CSC) (Kavukcuoglu et al, 2010) and spatial pyramid matching (SPM) (Lazebnik et al, 2006). The multispectral features are learned in an unsupervised manner through CSC, followed by the summarization through SPM at various scales and locations. Eventually, the image-level tissue representation is fed into linear SVM for efficient classification (Fan et al, 2008). Compared with sparse coding, CSC possesses two merits: 1) invariance to translation; and 2) producing more complex filters, which contribute to more succinct feature representations. Meanwhile, the proposed approach also benefits from: 1) the biomedical intuitions that different color spectrums typically characterize distinct structures; and 2) the utilization of context, provided by SPM, which is important in diagnosis. In short, this example uses convolutional sparse coding for tissue classification, and was found to achieve superior performance compared to patch-based sparse feature learning algorithms. This example further indicated that learning features over multiple spectra can generate biological-component-specific filters. For example, the filters learned from the nuclear channel and protein/extracellular matrix channel respectively capture various nuclear regions and the structural connectivity within tissue sections.

Approach

In this example, we adopted CSC (Kavukcuoglu et al, 2010) as the fundamental module for learning filter banks, based on which the proposed multispectral unsupervised feature learning system (MCSCSPM) is constructed. As noted by several researchers (Bristow et al, 2013, Kavukcuoglu et al, 2010), sparse coding typically assumes that training image patches are independent from each other, and thus neglects the spatial correlation among them. In practice, however, this assumption typically leads to filters that are simply translated versions of each other, and, as a result, generate highly redundant feature representation. In contrast, CSC generates more compact features due to its intrinsic shift-invariant property. Moreover, CSC is capable of generating more complex filters capturing higher-older image statistics, compared to sparse coding that basically learns edge primitives (Kavukcuoglu et al, 2010).

Figure 11:
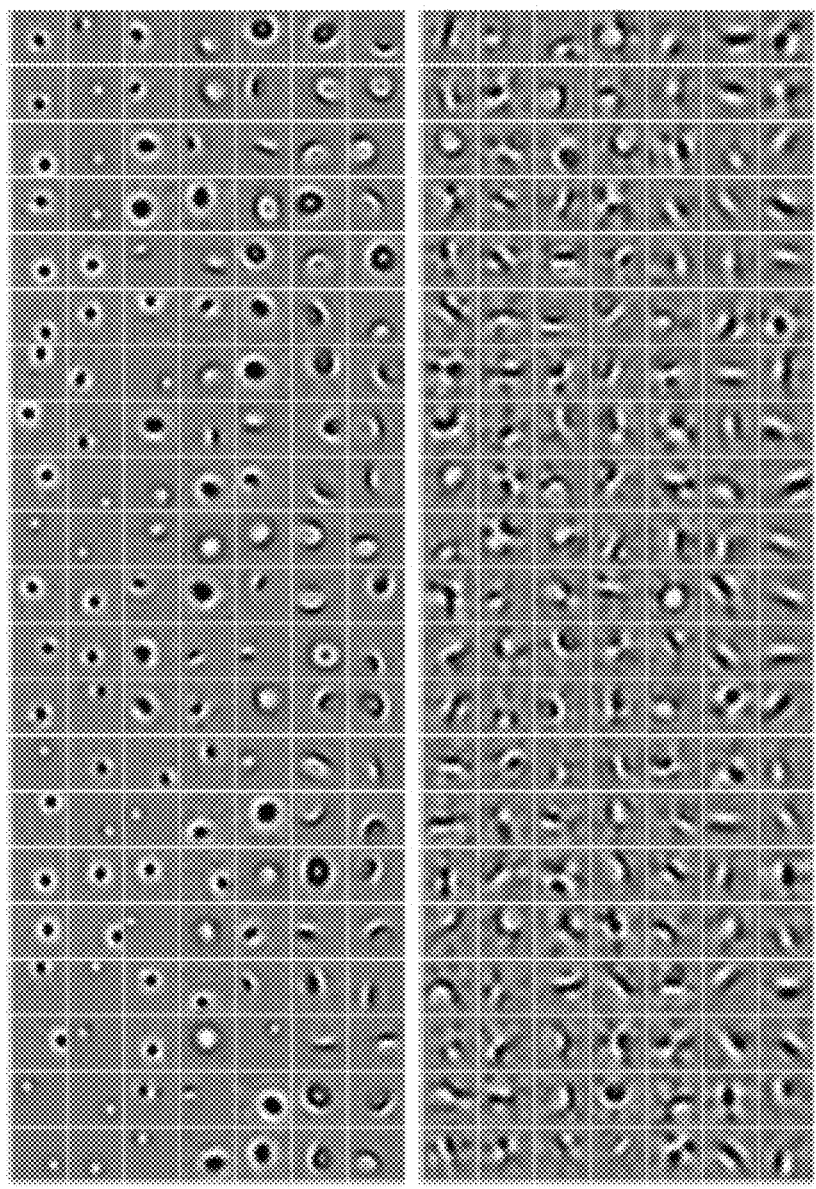
FIG. 11 shows 27×27 multispectral filters learned from the GBM dataset in an exemplary embodiment, where each tissue image is decomposed into two channels corresponding to the nuclei and protein contents with the learned filters shown in top and bottom figures, respectively.

In the proposed multispectral feature learning framework, CSC is applied to each separate spectral channel, yielding target-specific filter banks. For instance, some biologically meaningful filters are learned from the nuclear channel and the protein/extracellular matrix channel respectively, as illustrated in FIG. 11. Features extracted from multiple spectra are summarized by SPM (Lazebnik et al, 2006) at various scales and locations, and ultimate tissue representations are fed into linear SVM (Fan et al, 2008) for classification.

Convolutional Sparse Coding

Let $X=\{x_i\}_{i=1}^{N}$ be a training set containing N 2D images with dimension m×n. Let $D=\{d_k\}_{k=1}^{K}$ be the 2D convolutional filter bank having K filters, where each $d_k$ is an h×h convolutional kernel. Define $Z=\{Z_i\}_{i=1}^{N}$ be the set of sparse feature maps such that subset $Z^1=\{z^i_k\}_{k=1}^{K}$ consists of K feature maps for reconstructing image $x_i$, where $z^i_k$ has dimension (m+h−1)×(n+h−1). Convolutional sparse coding aims to decompose each training image $x_i$ as the sum of a series of sparse feature maps $z^i_k \in Z^1$ convolved with kernels $d_k$ from the filter bank D, by solving the following objective function:

$$\min_{D,Z} \mathcal{L} = \sum_{i=1}^{N}\left\{\left\|x_i - \sum_{k=1}^{K} d_k * z^i_k\right\|^2_F + \alpha \sum_{k=1}^{K}\|z^i_k\|_1\right\} \quad (10)$$

$$s.t.\ \|d_k\|_2^2 = 1,\ \forall\ k = 1, \cdots, K$$

where the first and the second term represents the reconstruction error and the $l_1$-norm penalty respectively; α is a regularization parameter; * is the 2D discrete convolution operator; and filters are restricted to have unit energy to avoid trivial solutions. Note that here $\|z\|_1$ represents the entry-wise matrix norm, i.e., $\|z\|_1 = \Sigma_{i,j}|z_{ij}|$, where is the entry at location (i,j) of a feature map $z \in Z$. The construction of D is realized by balancing the reconstruction error and the l1-norm penalty.

Note that the objective of Eq. (10) is not jointly convex with respect to D and Z but is convex with respect to one of the variables with the other remaining fixed (Mairal et al, 2009). Thus, we solve Eq. (10) by alternatively optimizing the two variables, i.e., iteratively performing the two steps that first compute Z and then update D. We use the Iterative Shrinkage Thresholding Algorithm (ISTA) to solve for the sparse feature maps Z. The updating policy for the convolutional dictionary D uses the stochastic gradient descent for efficient estimation of the gradient by considering one training sample at a time (Kavukcuoglu et al, 2010). The optimization procedure is sketched in Algorithm 1. Alternative methods for updating the dictionary can be found in (Bristow et al, 2013, Zeiler et al, 2010, Zeiler et al, 2011).

---

Algorithm I CSC Algorithm

Input: Training set $X = \{x_i\}_{i=1}^{N}$, K, α
Output: Convolutional filter bank $D = \{d_k\}_{k=1}^{K}$ 1:     Initialize: $D \sim \mathcal{N}(0, 1)$, $Z \leftarrow 0$
2:     repeat
3:         for i = 1 to N do
4:             Normalize each kernel in D to unit energy
5:             Fixing D, compute sparse feature maps $Z^i$ by solving $$Z^i \leftarrow \arg\min_{z^i_k \in Z^i}\left\|x_i - \sum_{k=1}^{K} d_k * z^i_k\right\|^2_F + \alpha \sum_{k=1}^{K}\|z^i_k\|_1$$

6:         Fixing Z, update D as
            $D \leftarrow D - \mu \nabla_D \mathcal{L}(D, Z)$
7:         end for
8:     until Convergence (maximum iterations reached or objective function ≤ threshold)

---

Feature Extraction

Figure 10:
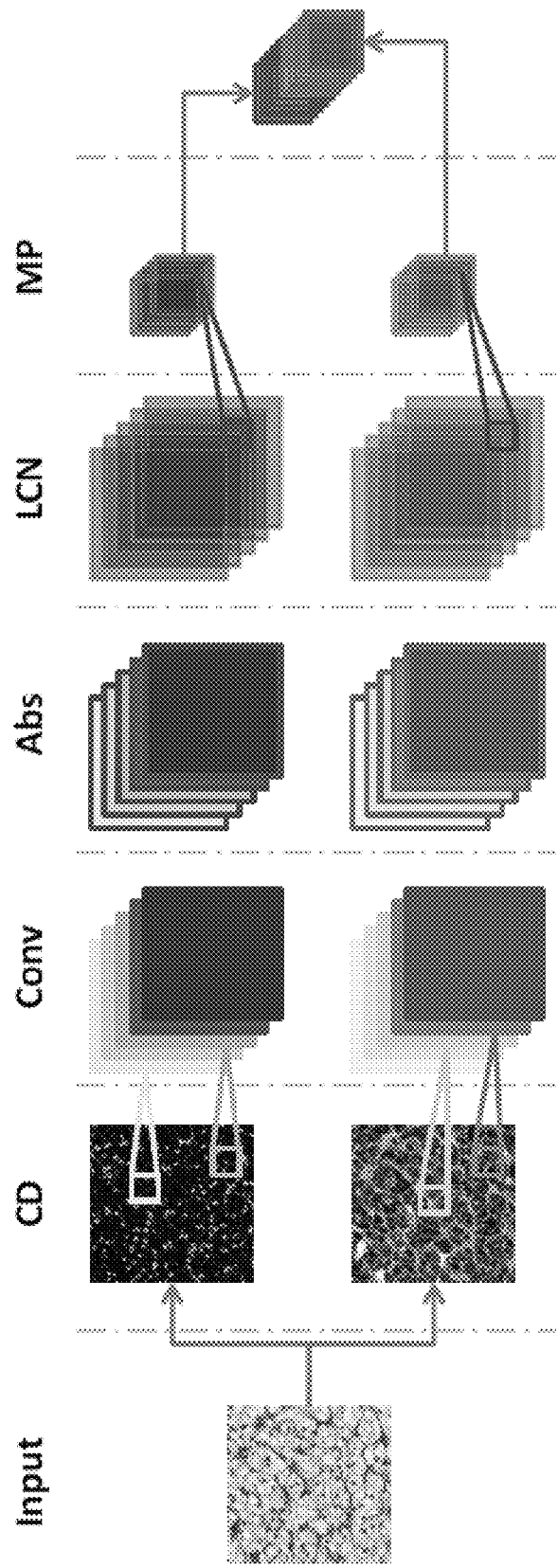
FIG. 10 shows a schematic diagram illustrating an exemplary embodiment of automatic feature extraction from multispectral images. CD means color decomposition; Cony means convolution; Abs means absolute value rectification; LCN means local contrast normalization; MP means max-pooling.

In the field of biomedical imaging, different spectra usually capture distinct targets of interest. Specifically, in our case, color decomposition (Ruifork et al, 2001) produces two separate spectra (channels) which characterize the nuclear chromatin and matrix, respectively (as shown in FIG. 10). Therefore, in the filter learning phase, we propose to apply convolutional sparse coding to each spectrum, separately, for the purpose of learning biological-component-specific feature detectors. Without the loss of generality, we assume that the number of filters for each spectrum (channel) is K and there are S spectra (channels) after decomposition; the 2D feature map $y^s_k$ is then defined as: $y^s_k = d^s_k * \hat{x}^s$, for $1 \leq k \leq K$ and $1 \leq s \leq S$, where $\hat{x}_s$ is the s-th spectrum component of input image x and $d^s_k \in D^s$ is the k-th convolutional kernel in filter bank $D^s$ learned over spectrum with index s.

Upon learning the filter bank, we extract multispectral tissue histology features using the proposed framework illustrated in FIG. 10, where an input image is first decomposed and divided into several spectral channels and then each decomposed component is convolved with the channel-specific filter bank followed by three cascaded layers, namely, element-wise absolute value rectification (Abs), local contrast normalization (LCN), and max-pooling (MP) (Jarrett et al, 2009). Note that for specificity, the model in FIG. 10 shows only two spectra, but it is straightforward to generalize to hyperspectral image-based applications. The Abs layer computes absolute value element wisely in each feature map, $y^s_k$, to avoid the cancelation effect in sequential operations. The LCN layer aims to enhance the stronger feature responses and suppress weaker ones across feature maps, $\{y^s_k\}_{k=1}^{K}$, in each spectrum, by performing local subtractive and divisive operations. The MP layer partitions each feature map into non-overlapping windows and extracts the maximum response from each of the pooling window.

The MP operation allows local invariance to translation (Jarrett et al, 2009). Finally, the multispectral tissue features are formed by aggregating feature responses from all spectra.

We further denote the multispectral tissue features of image, x, as a 3D array, $U \in \mathbb{R}^{a \times b \times K \cdot S}$, where the first two dimensions indicate the horizontal and vertical locations of a feature vector in the image plane and the third dimension represents the length of feature vectors. The multispectral tissue features are then fed into SPM framework for classification as detailed in the following section.

SPM

Let $V=[v_1, \ldots, v_T] \in \mathbb{R}^{KS \times T}$ be the feature set of T feature vectors having dimension K S. In the standard SPM framework (Lazebnik et al, 2006), the first step is to construct a codebook $B=[b_1, \ldots, b_P] \in \mathbb{R}^{KS \times P}$, which includes P multispectral tissue morphometric types, by solving the following optimization problem:

$$\min_{B,C} \sum_{i=1}^{T} \|v_i - Bc_i\|^2 \qquad (11)$$
$$s.t. \quad \text{card}(c_i) = 1, \|c_i\|_1 = 1, c_i \geq 0, \forall i$$

where $C=[c_1, \ldots, c_T] \in \mathbb{R}^{P \times T}$ is a set of codes for reconstructing V, cardinality constraint card($c_i$) enforces $c_i$ to have only one nonzero element, ci≥ 0 is a non-negative constraint on all vector elements. Eq. (11) is optimized by alternating between the two variables, i.e., minimizing one while keeping the other fixed. After training, the query signal set V is encoded via Vector Quantization (VQ) based on codebook B, i.e., assigning each $v_i$ to its closest multispectral tissue type in B.

The second step is to construct the spatial histogram for SPM (Lazebnik et al, 2006). This is done by dividing an image into increasingly finer subregions and computing local histograms of different multispectral tissue types falling into each of the subregions. The spatial histogram, H, is then formed by concatenating the appropriately weighted histograms of multispectral tissue types at all resolutions, i.e., $$H_0 = H_0^0 \qquad (12)$$
$$H_l = (H_l^1, \cdots, H_l^{4^l}), 1 \leq l \leq L$$
$$H = \left(\frac{1}{2^L} H_0, \frac{1}{2^L} H_1, \cdots, \frac{1}{2^{L-l+1}} H_l, \cdots, \frac{1}{2} H_L\right)$$

where (·) is the vector concatenation operator, $l \in \{0, \ldots, L\}$ is the resolution level of the image pyramid, and $H_l$ represents the concatenation of histograms for all image subregions at pyramid level l. In tissue classification, SPM intrinsically summarizes tissue morphometric contexts by computing and aggregating local histograms at various scales and locations. This is analogous to the fact that pathologists use "contexts" to determine a disease state (see Example 2, supra).

For the final classification, a homogeneous kernel map (Vedaldi et al, 2012) is employed to approximate $\chi^2$ kernel, which enables efficient linear SVM (Fan et al, 2008) training and classification.

Experiments and Results

In this section, we present detailed experimental design and evaluation of a proposed approach in tissue histopathology classification. The two distinct tumor datasets, for evaluation, are curated from The Cancer Genome Atlas (TCGA), namely (i) Glioblastoma Multiforme (GBM) and (ii) Kidney Renal Clear Cell Carcinoma (KIRC), which are publicly available from the NIH (National Institute of Health) repository.

Experimental Setup

We have evaluated the proposed method (MCSCSPM) in three different variations:

1. MCSCSPM-HE: Convolutional filter banks are learned from/applied to decomposed spectrum (channel) separately. Here, we have two spectra after decomposition, which correspond to nuclear chromatin (stained with hematoxylin) and protein/extracellular matrix (stained with eosin), respectively.
2. MCSCSPM-RGB: Convolutional filter banks are learned from/applied to R, G, and B channels separately.
3. MCSSPM-Gray: Convolutional filter banks are learned from/applied to the grayscale image.

and compared its performance with other four classification methods on the GBM and KIRC datasets. Implementation details of all approaches involved are listed as follows:

1. MCSCSPM: the nonlinear kernel SPM that uses spatial-pyramid histograms of multispectral tissue types and homogeneous kernel map. In the multispectral case, an input tissue image was decomposed into two spectra (i.e., S=2) corresponding to the nuclear chromatin and the protein/extracellular matrix respectively, based on the optical density matrix established in (Ruifork et al, 2001). In the RGB and grayscale case, each color channel was treated as one spectrum. For each spectrum, images were preprocessed with a 13×13 Gaussian filter. During training, we set K to 150 and 300 per spectrum for the GBM and KIRC datasets, respectively. The filter dimension was 27×27 for both datasets. The sparsity regularization parameter α was set to 0.1 for best performance. During multispectral feature extraction, we used the same 13×13 Gaussian filter for local contrast normalization and empirically set the max-pooling stepsize to be 27.
2. PSDSPM (see Example 1, supra): the nonlinear kernel SPM that uses spatial-pyramid histograms of sparse tissue morphometric types and homogeneous kernel map. The image patch size was set to 20×20, the number of basis function was set to 1024 and the sparsity regularization parameter was set to 0.3 for best performance.
3. ScSPM (Yang et al, 2009): the linear SPM that uses linear kernel on spatial-pyramid pooling of SIFT sparse codes. The dense SIFT features was extracted on 16×16 patches sampled from each image on a grid with stepsize 8 pixels. The sparsity regularization parameter λ was set to 0.15, to achieve the best performance;
4. KSPM (Lazebnik et al, 2006): the nonlinear kernel SPM that uses spatial-pyramid histograms of SIFT features and homogeneous kernel map. The dense SIFT features was extracted on 16×16 patches sampled from each image on a grid with stepsize 8 pixels;
5. SMLSPM (see Example 2, supra): the linear SPM that uses linear kernel on spatial-pyramid pooling of cellular morphometric sparse codes.

On the implementation of SPM for MCSCSPM, PSDSPM, KSPM and SMLSPM, we use the standard K-means clustering for constructing the dictionary and set the level of pyramid to be 3. Following the conventional evaluation procedure, we repeat all experiments 10 times with random splits of training and test set to obtain reliable results. The final results are reported as the mean and standard deviation of the classification rates on the following two distinct datasets, which include vastly different tumor types:

1. GBM Dataset. It contains 3 classes: Tumor, Necrosis, and Transition to Necrosis, which were curated from whole slide images (WSI) scanned with a 20× objective (0.502 micron/pixel). Examples can be found in FIG. 5. The number of images per category is 628, 428 and 324, respectively. Most images are 1000×1000 pixels. In this experiment, we train on 40, 80 and 160 images per category and tested on the rest, with three different dictionary sizes: 256, 512 and 1024. Detailed comparisons are shown in Table 11.

2. KIRC Dataset. It contains 3 classes: Tumor, Normal, and Stromal, which were curated from whole slide images (WSI) scanned with a 40× objective (0.252 micron/pixel). Examples can be found in FIG. 5. The number of images per category is 568, 796 and 784, respectively. Most images are 1000×1000 pixels. In this experiment, we train on 70, 140 and 280 images per category and tested on the rest, with three different dictionary sizes: 256, 512 and 1024. Detailed comparisons are shown in Table 12.

TABLE 11

Performance of different methods on the GBM dataset.

| | Method | DictionarySize = 256 | DictionarySize = 512 | DictionarySize = 1024 |
|---|---|---|---|---|
| 160 training | MCSCSPM-HE | 92.71 ± 0.91 | 93.01 ± 1.10 | 92.65 ± 0.75 |
| | CSCSPM-RGB | 92.58 ± 0.94 | 92.50 ± 0.86 | 92.47 ± 0.73 |
| | MCSCSPM-Gray | 86.33 ± 1.12 | 86.74 ± 0.91 | 86.69 ± 0.81 |
| | PSDSPM [5] | 91.02 ± 1.89 | 91.41 ± 0.95 | 91.20 ± 1.29 |
| | SMLSPM [4] | 92.35 ± 0.83 | 92.57 ± 0.91 | 92.91 ± 0.84 |
| | ScSPM [23] | 79.58 ± 0.61 | 81.29 ± 0.86 | 82.36 ± 1.10 |
| | KSPM [17] | 85.00 ± 0.79 | 86.47 ± 0.55 | 86.81 ± 0.45 |
| 80 training | MCSCSPM-HE | 91.41 ± 1.07 | 91.19 ± 0.91 | 91.13 ± 0.93 |
| | MCSCSPM-RGB | 90.88 ± 1.06 | 91.28 ± 0.82 | 90.85 ± 0.67 |
| | MCSCSPM-Gray | 84.67 ± 1.63 | 84.53 ± 1.58 | 84.56 ± 1.62 |
| | PSDSPM [5] | 88.63 ± 0.91 | 88.91 ± 1.18 | 88.64 ± 1.08 |
| | SMLSPM [4] | 90.82 ± 1.28 | 90.29 ± 0.68 | 91.08 ± 0.69 |
| | ScSPM [23] | 77.65 ± 1.43 | 78.31 ± 1.13 | 81.00 ± 0.98 |
| | KSPM [17] | 83.81 ± 1.22 | 84.32 ± 0.67 | 84.49 ± 0.34 |
| 40 training | MCSCSPM-HE | 89.16 ± 1.04 | 89.21 ± 0.75 | 88.84 ± 0.83 |
| | MCSCSPM-RGB | 89.24 ± 1.03 | 89.46 ± 1.14 | 89.53 ± 1.20 |
| | MCSCSPM-Gray | 81.37 ± 1.55 | 81.31 ± 1.19 | 80.80 ± 1.71 |
| | PSDSPM [5] | 84.06 ± 1.16 | 83.72 ± 1.46 | 83.40 ± 1.14 |
| | SMLSPM [4] | 88.05 ± 1.38 | 87.88 ± 1.04 | 88.54 ± 1.42 |
| | ScSPM [23] | 73.60 ± 1.68 | 75.58 ± 1.29 | 76.24 ± 3.05 |
| | KSPM [17] | 80.54 ± 1.21 | 80.56 ± 1.24 | 80.46 ± 0.56 |

TABLE 12

Performance of different methods on the KIRC dataset.

| | Method | DictionarySize = 256 | DictionarySize = 512 | DictionarySize = 1024 |
|---|---|---|---|---|
| 280 training | MCSCSPM-HE | 97.39 ± 0.36 | 97.51 ± 0.41 | 97.48 ± 0.40 |
| | MCSCSPM-RGB | 97.11 ± 0.44 | 97.49 ± 0.46 | 97.44 ± 0.43 |
| | MCSCSPM-Gray | 88.76 ± 0.59 | 90.50 ± 0.70 | 91.28 ± 0.72 |
| | PSDSPM [5] | 97.19 ± 0.49 | 97.27 ± 0.44 | 97.08 ± 0.45 |
| | SMLSPM [4] | 98.15 ± 0.46 | 98.50 ± 0.42 | 98.21 ± 0.44 |
| | ScSPM [23] | 94.52 ± 0.44 | 96.37 ± 0.45 | 96.81 ± 0.50 |
| | KSPM [17] | 93.55 ± 0.31 | 93.76 ± 0.27 | 93.90 ± 0.19 |
| 140 training | MCSCSPM-HE | 96.73 ± 0.84 | 96.89 ± 0.48 | 96.84 ± 0.67 |
| | MCSCSPM-RGB | 96.14 ± 1.17 | 96.46 ± 1.06 | 96.64 ± 0.76 |
| | MCSCSPM-Gray | 86.79 ± 0.98 | 88.26 ± 0.59 | 88.50 ± 0.80 |
| | PSDSPM [5] | 96.80 ± 0.75 | 96.52 ± 0.76 | 96.55 ± 0.84 |
| | SMLSPM [4] | 97.40 ± 0.50 | 97.98 ± 0.35 | 97.35 ± 0.48 |
| | ScSPM [23] | 93.46 ± 0.55 | 95.68 ± 0.36 | 96.76 ± 0.63 |
| | KSPM [17] | 92.50 ± 1.12 | 93.06 ± 0.82 | 93.26 ± 0.68 |
| 70 training | MCSCSPM-HE | 95.32 ± 0.67 | 95.62 ± 0.29 | 95.40 ± 0.44 |
| | MCSCSPM-RGB | 94.45 ± 0.84 | 94.64 ± 0.72 | 94.45 ± 0.77 |
| | MCSCSPM-Gray | 84.04 ± 1.10 | 85.13 ± 0.79 | 84.66 ± 1.14 |
| | PSDSPM [5] | 95.12 ± 0.54 | 95.13 ± 0.51 | 95.09 ± 0.40 |
| | SMLSPM [4] | 96.20 ± 0.85 | 96.37 ± 0.85 | 96.19 ± 0.62 |
| | ScSPM [23] | 91.93 ± 1.00 | 93.64 ± 0.72 | 94.86 ± 0.86 |
| | KSPM [17] | 90.78 ± 0.98 | 91.34 ± 1.13 | 91.59 ± 0.97 |

Multispectral (HE) vs. RGB v.s. Gray. For GBM dataset, K was fixed to be 150 per spectrum (channel), which led to a total number of 300, 450 and 150 filters for MCSCSPM-HE, MCSCSPM-RGB and MCSCSPM-Gray, respectively. For the KIRC dataset, K was fixed to be 300 per spectrum (channel), which led to a total number of 600, 900 and 300 filters for MCSCSPM-HE, MCSCSPM-RGB and MCSCSPM-Gray, respectively. Table 11 and Table 12 show that, even with smaller number of filters, MCSCSPM-HE outperforms MCSCSPM-RGB in most cases. This is to the fact that, after color decomposition, the resulting two spectra are biological-component-specific, such that specialized filters can be obtained from each spectrum characterizing nuclear architecture and tissue structural connectivities, respectively, as demonstrated in FIG. 11. Although the stain information (biological component information) leaks across channels for H&E stained tissue sections in its original RGB presentation, target-specific property can still be preserved to some extent (e.g., most of the nuclear information resides in blue (B) channel); and this explains why MCSCSPM-RGB still has reasonable performance. However, when such a property is completely lost in grayscale, MCSCSPM-Gray sees a dramatic performance drop.

Convolutional v.s. patch-based sparse modeling. As listed in Table 11 and Table 12, the proposed approach, MCSCSPM-HE/MCSCSPM-RGB outperforms patchbased sparse feature learning models, e.g., PSDSPM (see Example 1, supra), with fewer filters than PSDSPM. These facts indicate that, in tissue classification, convolutional sparse coding is more effective than traditional sparse coding in terms of using more succinct representations and producing better results, which has already been confirmed in other applications (Kavukcuoglu et al, 2010).

Unsupervised feature learning vs. hand-engineered features. As shown in Table 11 and Table 12, the proposed approach significantly outperforms systems that are built on hand-engineered features for general image classification purpose (e.g., KSPM, ScSPM). Even compared to the recently proposed system, SMLSPM (see Example 2, supra), which is built upon features with biological prior knowledge, the proposed approach, MCSCSPM, robustly achieves very competitive performance over the two different tumor types, where MCSCSPM-HE performs better on the GBM dataset, while worse on the KIRC dataset. This confirms that the proposed approach, MCSCSPM, is a useful tool for analyzing large cohorts with substantial technical variations and biological heterogeneities.

In this example, we propose a multispectral convolutional sparse coding framework for classification of histology sections with diverse phenotypic signatures. Our approach is benefited by exploiting multiple spectra, which potentially contain target-specific information for learning highly diversified feature detectors. We show that by decomposing images into nuclei and protein/extra-cellular content, biological-component-specific filters can be learned, which capture the nuclear architecture of distinct shapes and the structural connectivity within tissue sections, respectively. The multispectral features are then summarized within distinct tissue contexts at various scales and locations through SPM for classification. Experimental results show that the proposed approach outperforms patch-based sparse feature learning models (e.g., PSDSPM) and human-engineered features (e.g., SIFT); while generates very competitive performance compared to the dedicated system incorporating biological prior knowledge (i.e., SMLSPM).

Example 4

Certain tumor cell types and/or morphometric signatures cannot be processed using the protocol shown in FIG. 6. The engineered features, such as those that couple LoG filters and RGB signals, are simply inadequate for capturing complex local features, as demonstrated in our previous research (Reference: Chang, H., Han, J., Borowsky, A., Loss, L., Gray, J. W., Spellman, P. T., Parvin, B.: Invariant delineation of nuclear architecture in glioblastoma multiforme for clinical and molecular association. *IEEE Transactions on Medical Imaging* 32(4) (2013a) 670-682.). With the loss of chromatin patterns, the current models simply do not work. Sometimes loss of chromatin is due to artifacts in fixation and/or staining. However, it can also be due to a phenotype known as vesicular chromatin structure, where a visible nuclear membrane is coupled with the loss of the chromatin content. It is rather complex to model these structural aberrations with engineered feature detectors. Two approaches are proposed here:

Approach

Formulation I for Unsupervised Feature Learning for Nuclear Segmentation:

$$L = \min_{D,w,Z} \left\| X - \sum_{i=1}^{k} D_i * Z_i \right\|_F^2 + \left\| Y - \sum_{i=1}^{k} w_i \sigma(D_i * X) \right\|_F^2 + \|Z\|_1$$

X is the image
Y is the annotation mask (binary)
$Z_i$ is the i-th sparse feature map associated with the i-th convolution kernel $D_i$
$w_i$ is the i-the weight, which is a scalar Simplified Formulation I for Unsupervised Feature Learning for Nuclear Segmentation:

$$L = \min_{D,w} \left\| Y - \sum_{i=1}^{k} w_i \sigma(D_i * X) \right\|_F^2$$

X is the image
Y is the annotation mask (binary)
$D_i$ is the i-th convolutional kernel
$w_i$ is the i-th weight, which is a scalar Formulation II for Unsupervised Feature Learning for Nuclear Segmentation:

$$L = \min_{D,B,Z} \left\| X - \sum_{i=1}^{k} D_i * Z_i \right\|_F^2 + \left\| Y - \sum_{i=1}^{k} B_i * Z_i \right\|_F^2 + \|Z\|_1$$

X is the image
Y is the annotation binary mask
$D_i$ is the i-th convolution kernel for image
$B_i$ is the i-th convolution kernel for mask
Both $D_i$ and $B_i$ are convolution kernels. These learned kernels enable classification and representation in a fully autonomous fashion based on a natural spatial distribution of phenotypic signatures. The net result of this system is a pixel-based classification of nuclear and non-nuclear regions, which can be regularized using graph cut formalism. The graph cut formalism enforces spatial continuity to reduce noise.

Experiments and Results

Figure 12:
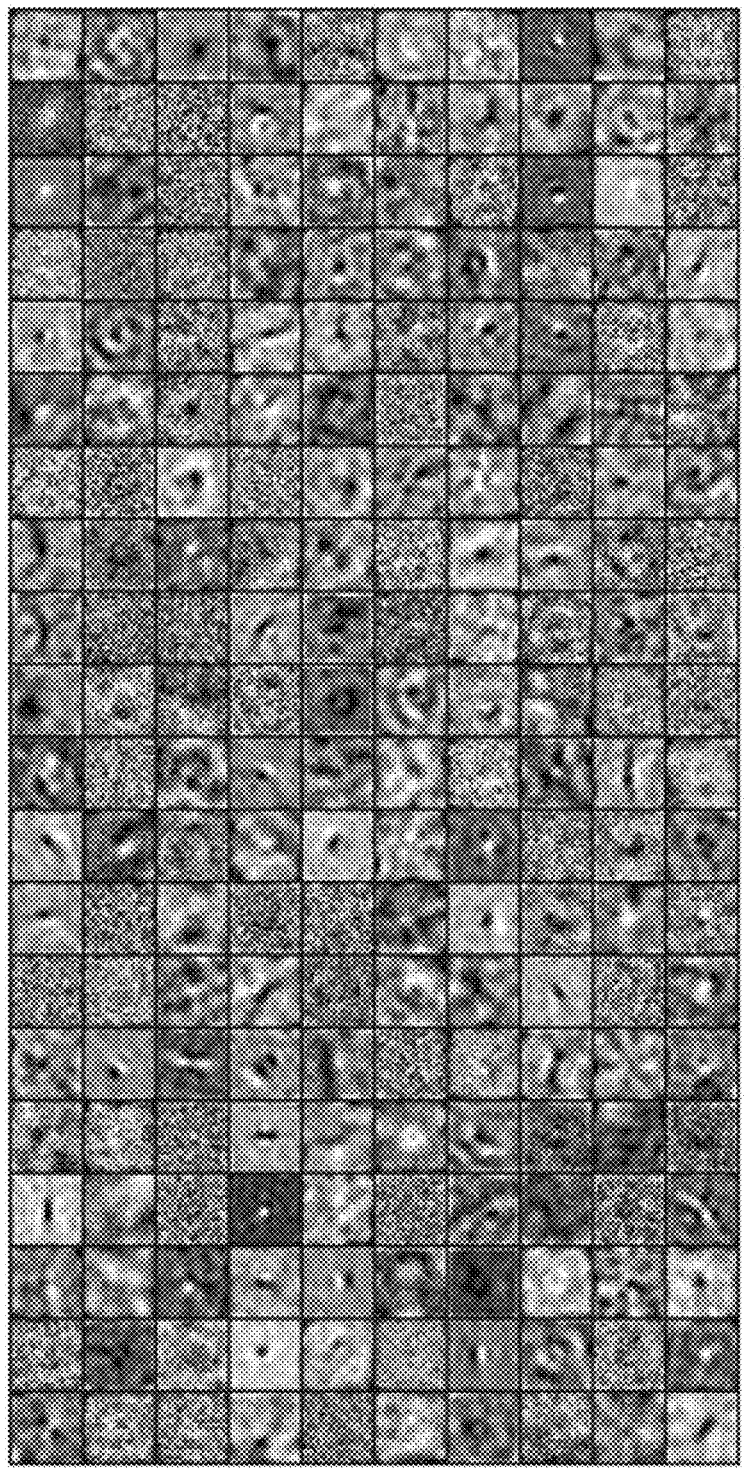
FIG. 12 shows 200 filters learned from Formulation I of using convolutional sparse coding for delineating nuclear regions.

FIG. 12 shows the resulting dictionary atoms of Formulation I. Using the Simplified Formulation I, we achieved Precision of 0.8004 and Recall of 0.7133.

Figure 13:
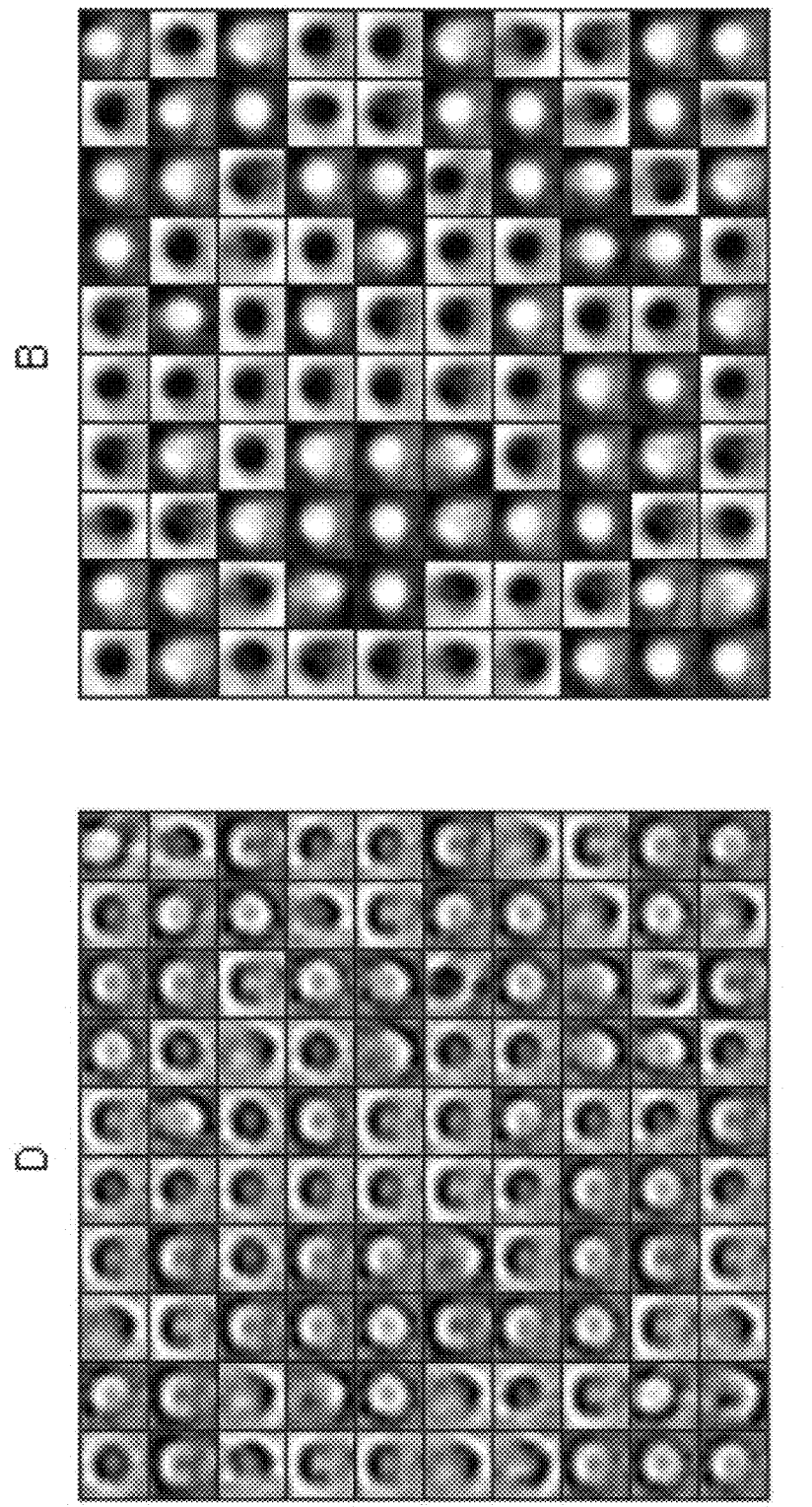
FIG. 13 shows 100 atoms of D and B learned from Formulation II of using convolutional sparse coding for delineating nuclear regions.

FIG. 13 shows 100 atoms of D and B, size 21×21, using Formulation II.

The foregoing detailed description of embodiments refers to the accompanying drawings, which illustrate specific embodiments of the present disclosure. Other embodiments having different structures and operations do not depart from the scope of the present disclosure. The term "the invention" or the like is used with reference to certain specific examples of the many alternative aspects or embodiments of the applicants' invention set forth in this specification, and neither its use nor its absence is intended to limit the scope of the applicants' invention or the scope of the claims. This specification is divided into sections for the convenience of the reader only. Headings should not be construed as limiting of the scope of the invention. The definitions are intended as a part of the description of the invention. It will be understood that various details of the present invention may be changed without departing from the scope of the present invention. Furthermore, the foregoing description is for the purpose of illustration only, and not for the purpose of limitation.

All publications, including patent documents and scientific articles, referred to in this application and the bibliography and attachments are incorporated by reference for the referenced materials and in their entireties for all purposes to the same extent as if each individual publication were individually incorporated by reference.

Citation of the above publications or documents is not intended as an admission that any of the foregoing is pertinent prior art, nor does it constitute any admission as to the contents or date of these publications or documents.

In some embodiments, the systems comprise a computer system including, but not limited to, hardware and/or software elements configured for performing logic operations and calculations, input/output operations, machine communications, or the like. A computer system may include familiar computer components, such as one or more one or more data processors or central processing units (CPUs), one or more graphics processors or graphical processing units (GPUs), memory subsystem, storage subsystem, one or more input/output (I/O) interfaces, communications interface, or the like. A computer system can include system bus interconnecting the above components and providing functionality, such connectivity and inter-device communication. A computer system may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

Many hardware and/or software configurations of a computer system may be apparent to the skilled artisan, which are suitable for use in implementing the algorithms, formulations and algorithms as described herein. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may use techniques described above as implemented upon a chip or an auxiliary processing board.

Various embodiments of an algorithm as described herein can be implemented in the form of logic in software, firmware, hardware, or a combination thereof. The logic may be stored in or on a machine-accessible memory, a machine-readable article, a tangible computer readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention. The various embodiments of the invention should be understood that they have been presented by way of example only, and not by way of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the invention, whether or not such embodiments are described, and whether or not such features are presented as being a part of a described embodiment. Thus the breadth and scope of the invention should not be limited by any of the above-described exemplary embodiments.

Terms and phrases used in this document, and embodiments thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless apparent from the context or expressly stated otherwise. Similarly, a group of items linked with the conjunction "or" should not be read as requiring mutual exclusivity among that group, but rather should also be read as "and/or" unless it is apparent from the context or expressly stated otherwise. Furthermore, although items, elements or components of the invention may be described or claimed in the singular, the plural is contemplated to be within the scope thereof unless limitation to the singular is explicitly stated. For example, "at least one" may refer to a single or plural and is not limited to either. The presence of broadening words and phrases such as "one or more," "at least," "but not limited to", or other like phrases in some instances shall not be read to mean that the narrower case is intended or required in instances where such broadening phrases may be absent.

REFERENCES

Ali, S., Madabhushi, A.: An integrated region-, boundry-, and shape-based active contour for multiple object overlap resolution in histological imagery. *IEEE Transactions on Medical Imaging* 31(7) (2012) 1448-1460.

D. Axelrod, N. Miller, H. Lickley, J. Qian, W. Christens-Barry, Y. Yuan, Y. Fu, and J. Chapman. Effect of quantitative nuclear features on recurrence of ductal carcinoma in situ (dcis) of breast. In *Cancer Informatics*, 4:99-109, 2008.

A. Basavanhally, J. Xu, A. Madabhushu, and S. Ganesan. Computer-aided prognosis of ER+ breast cancer histopathology and correlating survival outcome with oncotype DX assay. In *ISBI, pages* 851-854, 2009.

R. Bhagavatula, M. Fickus, W. Kelly, C. Guo, J. Ozolek, C. Castro, and J. Kovacevic. Automatic identification and delineation of germ layer components in h&e stained images of teratomas derived from human and nonhuman primate embryonic stem cells. In *ISBI*, pages 1041-1044, 2010.

O. Boiman, E. Shechtman, and M. Irani. In defense of nearest-neighbor based image classification. In *Proceedings of the Conference on Computer Vision and Pattern Recognition*, pages 1-8, 2008.

A. Bosch, A. Zisserman, and X. Mu~noz. Scene classification using a hybrid generative/discriminative approach. *IEEE Transactions on Pattern Analysis and Machine Intelligence,* 30(4):712-727, April 2008.

H. Bristow, A. Eriksson, and S. Lucey. Fast convolutional sparse coding. In *Computer Vision and Pattern Recognition (CVPR)*, 2013 IEEE Conference on, Pages 391-398, 2013.

H. Chang, M. Auer, and B. Parvin, Structural annotation of EM images by graph cut, In *IEEE ISBI*, pages 1103-1106, 2009.

H. Chang, G. Fontenay, J. Han, G. Cong, F. Baehner, J. Gray, P. Spellman, and B. Parvin. Morphometric analysis of TCGA Gliobastoma Multiforme. *BMC Bioinformatics,* 12(1), 2011.

H. Chang, L. Loss, P. Spellman, A. Borowsky, and B. Parvin. Batch-invariant nuclear segmentation in whole mount histology sections. In *ISBI*, pages 856-859, 2012.

Chang, H., Han, J., Borowsky, A., Loss, L., Gray, J. W., Spellman, P. T., Parvin, B.: Invariant delineation of nuclear architecture in glioblastoma multiforme for clinical and molecular association. *IEEE Transactions on Medical Imaging* 32(4) (2013a) 670-682.

H. Chang, A. Borowsky, P. Spellman, and B. Parvin. Classification of tumor histology via morphometric context. In *Proceedings of the Conference on Computer Vision and Pattern Recognition,* 2013b.

H. Chang, N. Nayak, P. Spellman, and B. Parvin. Characterization of tissue histopathology via predictive sparse decomposition and spatial pyramid matching. *Medical image computing and computed-assisted intervention—MICCAI,* 2013 c.

L. Dalton, S. Pinder, C. Elston, I. Ellis, D. Page, W. Dupont, and R. Blamey. Histolgical gradings of breast cancer: linkage of patient outcome with level of pathologist agreements. *Modern Pathology,* 13(7):730-735, 2000.

M. Datar, D. Padfield, and H. Cline. Color and texture based segmentation of molecular pathology images using HSOMs. In *ISBI,* pages 292-295, 2008.

C. Demir and B. Yener. Automated cancer diagnosis based on histopathological images: A systematic survey. *Technical Report, Rensselaer Polytechnic Institute, Department of Computer Science,* 2009.

M. Elad and M. Aharon. Image denoising via sparse and redundant representations over learned dictionaries. *IEEE Transactions on Image Processing,* 15(12):3736-3745, December 2006.

S. Doyle, M. Feldman, J. Tomaszewski, N. Shih, and A. Madabhushu. Cascaded multi-class pairwise classifier (CASCAMPA) for normal, cancerous, and cancer confounder classes in prostate histology. In *ISBI,* pages 715-718, 2011.

M. Everingham, L. Van Gool, C. K. I. Williams, J. Winn, and A. Zisserman. The PASCAL Visual Object Classes Challenge 2012 (VOC2012) Results. http://www.pascalnetwork.org/challenges/VOC/voc2012/workshop/index.html.

R.-E. Fan, K.-W. Chang, C.-J. Hsieh, X.-R. Wang, and C.-J. Lin. LIBLINEAR: A library for large linear classification. *Journal of Machine Learning Research,* 9:1871-1874, 2008.

H. Fatakdawala, J. Xu, A. Basavanhally, G. Bhanot, S. Ganesan, F. Feldman, J. Tomaszewski, and A. Madabhushi. Expectation-maximization-driven geodesic active contours with overlap resolution (EMaGACOR): Application to lymphocyte segmentation on breast cancer histopathology. *IEEE Transactions on Biomedical Engineering,* 57(7):1676-1690, 2010.

Ghaznavi, F., Evans, A., Madabhushi, A., Feldman, M.: Digital imaging in pathology: wholeslide imaging and beyond. *Annu Rev Pathology* 8 (2012) 331-359

K. Grauman and T. Darrell. The pyramid match kernel: discriminative classification with sets of image features. In *Proceedings of the IEEE International Conference on Computer Vision,* volume 2, pages 1458-1465, 2005.

M. Gurcan, L. Boucheron, A. Can, A. Madabhushi, N. Rajpoot, and Y. Bulent. Histopathological image analysis: a review. *IEEE Transactions on Biomedical Engineering,* 2:147-171, 2009.

J. Han, H. Chang, L. Loss, K. Zhang, F. Baehner, J. Gray, P. Spellman, and B. Parvin. Comparison of sparse coding and kernel methods for histopathological classification of glioblastoma multiforme. In *ISBI,* pages 711-714, 2011.

C. Huang, A. Veillard, N. Lomeine, D. Racoceanu, and L. Roux. Time efficient sparse analysis of histopathological whole slide images. *Computerized medical imaging and graphics,* 35(7-8):579-591, 2011.

K. Jarrett, K. Kavukcuoglu, M. Ranzato, and Y. LeCun. What is the best multi-stage architecture for object recognition? In *Computer Vision,* 2009 IEEE 12th International Conference on, pages 2146-2153, 2009.

K. Kavukcuoglu, M. Ranzato, and Y. LeCun. Fast inference in sparse coding algorithms with applications to object recognition. *Technical Report CBLL-TR*-2008 Dec. 1, *Computational and Biological Learning Lab, Courant Institute, NYU,* 2008.

J. Kong, L. Cooper, A. Sharma, T. Kurk, D. Brat, and J. Saltz. Texture based image recognition in microscopy images of diffuse gliomas with multi-class gentle boosting mechanism. In *ICASSAP, pages* 457-460, 2010.

S. Kothari, J. Phan, A. Osunkoya, and M. Wang. Biological interpretation of morphological patterns in histopathological whole slide images. In *ACM Conference on Bioinformatics, Computational Biology and Biomedicine,* 2012.

Kothari, S., Phan, J., Young, A., Wang, M.: Histological image classification using biologically interpretable shape-based features. *BMC Medical Imaging* 13(9), 2013.

S. Lazebnik, C. Schmid, and J. Ponce. Beyond bags of features: Spatial pyramid matching for recognizing natural scene categories. In *Proceedings of the Conference on Computer Vision and Pattern Recognition,* pages 2169-2178, 2006.

Q. Le, J. Han, J. Gray, P. Spellman, A. Borowsky, and B. Parvin. Learning invariant features from tumor signature. In *ISBI,* pages 302-305, 2012.

F.-F. Li and P. Perona. A bayesian hierarchical model for learning natural scene categories. In *Proceedings of the Conference on Computer Vision and Pattern Recognition,* pages 524-531, Washington, D.C., USA, 2005. IEEE Computer Society.

J. Mairal, F. Bach, J. Ponce, G. Sapiro, and A. Zisserman. Supervised dictionary learning. In *NIPS,* 2008.

J. Mairal, F. Bach, J. Ponce, and G. Sapiro. Online dictionary learning for sparse coding. In *Proceedings of the 26th Annual International Conference on Machine Learning,* ICML '09, pages 689-696, New York, N.Y., USA, 2009. ACM.

F. Moosmann, B. Triggs, and F. Jurie. Randomized clustering forests for building fast and discriminative visual vocabularies. In *NIPS,* 2006.

Nayak, N., Chang, H., Borowsky, A., Spellman, P. T., Parvin, B.: Classification of tumor histopathology via sparse feature learning. *In: International Symposium on Biomedical Imaging.* (2013)

N. Otsu. A threshold selection method from gray-level histograms. *IEEE Transactions on Systems, Man and Cybernetics,* 9(1):62-66, 1979.

P. Quelhas, F. Monay, J.-M. Odobez, D. Gatica-Perez, T. Tuytelaars, and L. Van Gool. Modeling scenes with local descriptors and latent aspects. In *Proceedings of the IEEE International Conference on Computer Vision, ICCV '05,* pages 883-890, Washington, D.C., USA, 2005. IEEE Computer Society.

R. Rigamonti and V. Lepetit. Accurate and efficient linear structure segmentation by leveraging ad hoc features with learned filters. In N. Ayache, H. Delingette, P. Golland, and K. Mori, editors, *Medical Image Computing and Computer-Assisted Intervention MICCAI 2012,* volume 7510 of *Lecture Notes in Computer Science,* pages 189-197. Springer Berlin Heidelberg, 2012.

A. Ruifork and D. Johnston. Quantification of histochemical staining by color decomposition. *Anal Quant Cytol Histology,* 23(4):291-299, 2001.

P. Sermanet, K. Kavukcuoglu, S. Chintala, and Y. Lecun. Pedestrian detection with unsupervised multi-stage feature learning. *In Computer Vision and Pattern Recognition (CVPR),* 2013 *IEEE Conference on,* pages 3626-3633, 2013.

T. Serre, L. Wolf, and T. Poggio. Object recognition with features inspired by visual cortex. In *Proceedings of the Conference on Computer Vision and Pattern Recognition,* volume 2, pages 994-1000, 2005.

A. Vedaldi and A. Zisserman. Efficient additive kernels via explicit feature maps. *IEEE Transactions on Pattern Analysis and Machine Intelligence*, 34(3):480-492, 2012.

Q. Wen, H. Chang, and B. Parvin. A Delaunay triangulation approach for segmenting clumps of nuclei. In *ISBI*, pages 9-12, 2009.

J. Yang, K. Yu, Y. Gong, and T. Huang. Linear spatial pyramid matching using sparse coding for image classification. In *Proceedings of the Conference on Computer Vision and Pattern Recognition*, pages 1794-1801, 2009.

R. A. Young and R. M. Lesperance. The gaussian derivative model for spatial-temporal vision. *I. Cortical Model. Spatial Vision*, 2001:3-4, 2001.

M. Zeiler, D. Krishnan, G. Taylor, and R. Fergus. Deconvolutional networks. In *Computer Vision and Pattern Recognition (CVPR), 2010 IEEE Conference on*, pages 2528-2535, 2010. 2, 3

M. Zeiler, G. Taylor, and R. Fergus. Adaptive deconvolutional networks for mid and high level feature learning. In *Computer Vision (ICCV), 2011 IEEE International Conference on*, pages 2018-2025, 2011.

Y. Zhou, H. Chang, K. Barner, P. Spellman, and B. Parvin. Classification of Histology Sections via Multispectral Convolutional Sparse Coding. In *Computer Vision and Pattern Recognition (CVPR), IEEE Conference on, pp.* 3081-3088, 2014.

H Chang, Y Zhou, P Spellman, and B Parvin, "Stacked Predictive Sparse Coding for Classification of Distinct Regions of Histopathology," International Conference on Computer Vision (ICCV), 2013.

What is claimed is:

1. A method for segmenting cell nuclei and classifying regions of histopathology or microanatomy, comprising:
    providing a plurality of reference images of histology sections;
    determining a first set of spatial basis functions for classifying histopathology or microanatomy of the histology sections into two or more classes from the reference images using an unsupervised feature learning technique for classification;
    classifying histopathology or microanatomy of the histology sections into the classes by reference to the first set of spatial basis functions;
    determining a second set of spatial basis functions for segmenting cell nuclei from the reference images using an unsupervised feature learning technique for nuclear segmentation comprising minimizing a function that includes a norm comprising:

$$Y - \sum_{i=1}^{k} w_i \sigma(D_i * X)$$

wherein X is an image, Y is an annotation mask, $D_i$ is an i-th convolutional kernel, $w_i$ is an i-th weight, which is scaler, k is a number of convolutional kernels, and * is a convolutional operation, wherein the first set of spatial basis functions are different from the second set of spatial basis functions; and
    segmenting the nuclear regions of the histology sections to determine boundaries of cell nuclei based on the second set of spatial basis functions.

2. The method of claim 1, wherein the unsupervised feature learning technique for nuclear segmentation comprises:

$$L = \min_{D,w} \left\| Y - \sum_{i=1}^{k} w_i \sigma(D_i * X) \right\|_F^2$$

wherein X is the image, Y is the annotation mask, $D_1$ is the i-th convolutional kernel, $w_i$ is the i-th weight, which is scaler, k is the number of convolutional kernels, F is a Frobenius norm, and * is the convolutional operation.

3. The method of claim 1, wherein the unsupervised feature learning technique for nuclear segmentation comprises:

$$L = \min_{D,w,Z} \left\| X - \sum_{i=1}^{k} D_i * Z_i \right\|_F^2 + \left\| Y - \sum_{i=1}^{k} w_i \sigma(D_i * X) \right\|_F^2 + \|Z\|_1$$

wherein X is the image, Y is the annotation mask, $Z_i$ is an i-th sparse feature map associated with the i-th convolutional kernel $D_i$, $w_i$ is the i-th weight, which is scaler, k is the number of convolutional kernels, F is a Frobenius norm, and * is the convolutional operation.

4. The method of claim 1, wherein the unsupervised feature learning technique for classification is by predictive sparse decompositions (PSDs) from random sampling of small patches of images.

5. The method of claim 4, where the PSDs are stacked to improve classification of histopathology or microanatomy.

6. The method of claim 1, wherein the reference images are labeled or annotated.

7. The method of claim 1, wherein the reference images are whole slide images of histology sections.

8. The method of claim 1, wherein the plurality of reference images comprises a plurality of multispectral reference images.

9. The method of claim 1, wherein the reference images were captured through bright field imaging, multiplexed imaging via labeled antibodies, infrared spectroscopy, or Raman microscopy.

10. The method of claim 1, wherein the histopathology is determined based on cell-based or tissue-based features.

11. The method of claim 10, wherein the cell-based features are cell-type, cell state, cellular organization or cell-to-cell boundary features.

12. The method of claim 1, wherein segmenting the nuclear regions in the reference images comprises segmenting cell nuclei based on human engineered features.

13. The method of claim 12, wherein segmenting the nuclear regions is based on segmenting nuclear morphometric features.

14. The method of claim 13, wherein the morphometric features are selected from the group consisting of: nuclear size, nuclear voronoi size, aspect ratio of the segmented nucleus, major axis, minor axis, rotation, bending energy, STD curvature, abs max curvature, mean nuclear intensity, STD nuclear intensity, mean background intensity, STD background intensity, mean nuclear gradient, and STD nuclear gradient.

15. The method of claim 14, further comprising building dictionaries from the nuclear morphometric features via vector quantization or sparse coding followed by spatial pyramid matching.

16. The method of claim 1, further comprising computing a histology signature to classify tumor grades of tissues in the sample tissue images.

17. The method of claim 16, wherein the histology signature relates to low grade glioma (LGG) or glioblastoma multiforme (GBM).

18. The method of claim 1, further comprising aggregating the classified histology types over a large cohort of samples to construct taxonomies of populations for evaluating therapeutic responses, predicting outcome, and discovery of new biomarkers.

19. The method of claim 1, further comprising aggregating nuclear features within regions of microanatomy or histopathology over a cohort for constructing taxonomies of nuclear architecture for evaluating therapeutic responses, predicting outcomes, and discovery of new biomarkers.

20. The method of claim 1, wherein the unsupervised feature learning technique for classification comprises building spatial histograms by spatial pooling of the features learned from the reference images.

21. The method of claim 1, wherein the unsupervised feature learning technique for classification is by convolutional sparse coding (CSC) and spatial pyramid matching (SPM).

22. A system for segmenting cell nuclei and classifying regions of histopathology or microanatomy, comprising:
a storage configured to store a plurality of reference images of histology sections; and
a processor configured to perform:
determining a first set of spatial basis functions for classifying histopathology or microanatomy of the histology sections into two or more classes from the reference images using an unsupervised feature learning technique for classification;
classifying histopathology or microanatomy of the histology sections into the classes by reference to the first set of spatial basis functions;
determining a second set of spatial basis functions for segmenting cell nuclei from the reference images using an unsupervised feature learning technique for nuclear segmentation comprising minimizing a function that includes a norm comprising:

$$Y - \sum_{i=1}^{k} w_i \sigma(D_i * X)$$

wherein X is an image, Y is an annotation mask, $D_i$ is an i-th convolutional kernel, $w_i$ is an i-th weight, which is scaler, k is a number of convolutional kernels, and * is a convolutional operation, wherein the first set of spatial basis functions are different from the second set of spatial basis functions; and
segmenting the nuclear regions of the histology sections based on the second set of basis functions.

23. The method of claim 22, wherein the unsupervised feature learning technique for nuclear segmentation comprises:

$$L = \min_{D,w} \left\| Y - \sum_{i=1}^{k} w_i \sigma(D_i * X) \right\|_F^2$$

wherein X is the image, Y is the annotation mask, $D_i$ is the i-th convolutional kernel, $w_i$ is the i-th weight, which is scaler, k is the number of convolutional kernels, and F is a Frobenius norm.

24. The method of claim 22, wherein the unsupervised feature learning technique for nuclear segmentation comprises:

$$L = \min_{D,B,Z} \left\| X - \sum_{i=1}^{k} D_i * Z_i \right\|_F^2 + \left\| Y - \sum_{i=1}^{k} B_i Z_i \right\|_F^2 + \|Z\|_1$$

wherein X is the image, Y is the annotation mask, $Z_i$ is an i-th sparse feature map associated with the i-th convolutional kernel $D_i$ for image and the i-th convolutional kernel for mask $B_i$, k is the number of convolutional kernels, F is a Frobenius norm, and * is the convolutional operation.

25. A method comprising:
receiving a plurality of reference images of histology sections;
classifying histopathology or microanatomy of the histology sections into two or more classes by reference to a first set of spatial basis functions or reference to human engineered features, wherein the first set of spatial basis functions is determined using an unsupervised feature learning technique for classification;
determining a second set of spatial basis functions using an unsupervised feature learning technique for nuclear segmentation comprising minimizing a function that includes a norm comprising:

$$Y - \sum_{i=1}^{k} w_i \sigma(D_i * X)$$

wherein X is an image, Y is an annotation mask, $D_i$ is an i-th convolutional kernel, $w_i$ is an i-th weight, which is scaler, k is a number of convolutional kernels, and * is a convolutional operation, wherein the first set of spatial basis functions are different from the second set of spatial basis functions; and
segmenting the nuclear regions of the histology sections based on the second set of basis functions.

26. The method of claim 25, wherein the human engineered features comprise one or more of cell-based features, one or more tissue-based features, or a combination thereof.

* * * * *